US011128409B2

United States Patent
Noh et al.

(10) Patent No.: US 11,128,409 B2
(45) Date of Patent: Sep. 21, 2021

(54) HYBRID AUTOMATIC REPEAT REQUESTS IN A WIRELESS LOCAL AREA NETWORK

(71) Applicant: NEWRACOM, Inc., Lake Forest, CA (US)

(72) Inventors: Sichan Noh, Seoul (KR); Yujin Noh, Irvine, CA (US); Jong-ee Oh, Irvine, CA (US); Min Seoung Kim, Irvine, CA (US); Dae Kyun Lee, Irvine, CA (US); Youngjae Jung, Seoul (KR); Hyobin Yim, Seoul (KR)

(73) Assignee: NEWRACOM, INC., Lake Forest, CA (US)

( * ) Notice: Subject to any disclaimer, the term of this patent is extended or adjusted under 35 U.S.C. 154(b) by 0 days.

(21) Appl. No.: 16/991,942

(22) Filed: Aug. 12, 2020

(65) Prior Publication Data

US 2021/0050952 A1 Feb. 18, 2021

Related U.S. Application Data

(60) Provisional application No. 62/886,264, filed on Aug. 13, 2019, provisional application No. 62/886,866, filed on Aug. 14, 2019.

(51) Int. Cl.
*H04L 1/18* (2006.01)
*H04W 72/04* (2009.01)
*H04W 80/02* (2009.01)

(52) U.S. Cl.
CPC ............ *H04L 1/1819* (2013.01); *H04L 1/189* (2013.01); *H04W 72/0466* (2013.01); *H04W 80/02* (2013.01)

(58) Field of Classification Search
CPC ..... H04L 1/1819; H04L 1/189; H04L 1/0068; H04L 1/1628; H04L 1/1621;
(Continued)

(56) References Cited

U.S. PATENT DOCUMENTS

| 2011/0044271 A1* | 2/2011 | Hong | H04W 28/06 370/329 |
| 2011/0179335 A1* | 7/2011 | Hong | H04L 1/0072 714/755 |

(Continued)

OTHER PUBLICATIONS

IEEE Std 802.11-2012: "Part 11: Wireless LAN Medium Access Control (MAC) and Physical Layer (PHY) Specifications," IEEE Standard for Information technology—Telecommunications and information exchange between systems, Local and metropolitan area networks—Specific requirements, Mar. 29, 2012, 2793 pages.

(Continued)

*Primary Examiner* — Afshawn M Towfighi
(74) *Attorney, Agent, or Firm* — Nicholson, De Vos, Webster & Elliott, LLP

(57) ABSTRACT

A method includes determining, by a Media Access Control (MAC) layer of a first wireless station, a total length of user data in a first Physical Layer (PHY) Protocol Data Unit (PPDU); determining, by the MAC layer, a Hybrid Automatic Repeat Request (HARQ) block size; adding a first indication to a transmission vector, wherein the first indication indicates the total length of user data in the first PPDU; adding a second indication to the transmission vector, wherein the second indication indicates the HARQ block size; passing the transmission vector to a PHY layer of the first wireless station; generating, by the PHY layer, the first PPDU based on the first indication and the second indication, wherein the first PPDU includes a first set of HARQ blocks that each have a size equal to the HARQ block size; and transmitting the first PPDU to a second wireless station.

20 Claims, 26 Drawing Sheets

(58) Field of Classification Search
CPC ....... H04L 1/0057; H04L 1/18; H04L 1/1867; H04W 72/0466; H04W 80/02
See application file for complete search history.

(56) References Cited

U.S. PATENT DOCUMENTS

2016/0050634 A1* 2/2016 Seok .................. H04W 52/146
370/338
2017/0099662 A1* 4/2017 Thubert ................ H04W 12/00

OTHER PUBLICATIONS

IEEE Std 802.11ac-2013 "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunications and information exchange between systems, Local and metropolitan area networks—Specific requirements, Dec. 18, 2013, 425 pages.

IEEE Std 802.11ah-2016, "Part 11: Wireless LAN Medium Access Control (MAC) and Physical Layer (PHY) Specifications, Amendment 2: Sub 1 GHz License Exempt Operation", IEEE Standard for Information technology—Telecommunications and information exchange between systems, Local and metropolitan area networks—Specific requirements, 2016, 594 pages.

* cited by examiner

| MAXIMUM PHY RATE | PHY RATE ENHANCEMENT | BANDWIDTH/NUMBER OF SPATIAL STREAMS | OPERATING BANDS | |
|---|---|---|---|---|
| IEEE 802.11B | 11 MBPS | - | 22 MHZ/1 SS | 2.4 GHZ |
| IEEE 802.11A/G | 54 MBPS | 5X | 2 MHZ/1 SS | 5 GHZ(A)/2.4 GHZ(G) |
| IEEE 802.11N | 600 MBPS | 11X | 40 MHZ/4 SS | 2.4/5 GHZ |
| IEEE 802.11AC | 6.9 GBPS | 11X | 160 MHZ/8 SS | 5 GHZ |
| IEEE 802.11AX | 9.6 GBPS | 1.4X | 160 MHZ/8 SS | 2.4/5 GHZ |
| IEEE 802.11BE | A GBPS | BX | 320 MHZ/16 SS | 2.4/5/6 GHZ |

FIG. 6

| ELEMENT/FIELD | DEFINITION 702 | DURATION 704 | DFT PERIOD 706 | GUARD INTERVAL (GI) 708 | SUBCARRIER SPACING 710 |
|---|---|---|---|---|---|
| LEGACY-SHORT TRAINING FIELD (L-STF) 712 | NON-HIGH THROUGHPUT(HT) SHORT TRAINING FIELD (STF) | 8 μs | - | - | equivalent to 1,250 kHz |
| LEGACY-LONG TRAINING FIELD (L-LTF) 714 | NON-HT LONG TRAINING FIELD (LTF) | 8 μs | 3.2 μs | 1.6 μs | 312.5 kHz |
| LEGACY-SIGNAL FIELD (L-SIG) 716 | NON-HT SIGNAL FIELD | 4 μs | 3.2 μs | 0.8 μs | 312.5 kHz |
| RL-SIG FIELD 718 | REPEATED NON-HT SIGNAL FIELD | 4 μs | 3.2 μs | 0.8 μs | 312.5 kHz |
| U-SIG FIELD 720 | UNIVERSAL SIGNAL FIELD | N$_{USIG}$ * 4 μs | 3.2 μs | 0.8 μs | 312.5 kHz |
| EHT-SIG FIELD 722 | EHT SIGNAL FIELD | N$_{EHESIG}$ * 4 μs | 3.2 μs | 0.8 μs | 312.5 kHz |
| EHT-HARQ FIELD 724 | EHT HARQ FIELD | - | - | - | - |
| EHT-STF 726 | EHT SHORT TRAINING FIELD | - | - | - | - |
| EHT-LTF 728 | EHT LONG TRAINING FIELD | N$_{EHTLTF}$ * (DTF period + GI) μs | 2xLTF: 6.4 μs 4xLTF: 12.8 μs | 0.8, 1.6, or 3.2 μs | 2xLTF: (equivalent to) 156.25 kHz; 4xLTF: 78.125 kHz |
| EHT-DATA FIELD 730 | EHT DATA FIELD | N$_{DATA}$ * (DTF period + GI) μs | 12.8 μs | 0.8, 1.6, or 3.2 μs | 78.125 kHz |
| EHT-MA FIELD 732 | EHT MIDAMBLE FIELD | - | - | - | - |

FIG. 7

| FIELD | SIZE (BITS) | DESCRIPTION |
|---|---|---|
| EOF 1002 | 1 | END OF FRAME INDICATION. SET TO 1 IN AN A-MPDU SUBFRAME THAT HAS 0 IN THE MPDU LENGTH FIELD AND THAT IS USED TO PAD THE A-MPDU IN A VHT PPDU. SET TO 1 IN THE MPDU DELIMITER OF AN S-MPDU. |
| RESERVED 1004 | 1 | |
| MPDU LENGTH 1006 | 14 | LENGTH OF THE MPDU IN OCTETS. SET TO 0 IF NO MPDU IS PRESENT. AN A-MPDU SUBFRAME WITH 0 IN THE MPDU LENGTH FIELD IS USED TO MEET A MINIMUM MPDU START SPACING REQUIREMENT AND ALSO TO PAD THE A-MPDU TO FILL THE AVAILABLE OCTETS IN A VHT PPDU. |
| CRC 1008 | 8 | 8-BIT CRC OF THE PRECEDING 16 BITS. |
| DELIMITER SIGNATURE 1010 | 8 | PATTERN THAT CAN BE USED TO DETECT AN MPDU DELIMITER WHEN SCANNING FOR AN MPDU DELIMITER. THE UNIQUE PATTERN IS 0X4E. THE ASCII VALUE OF THE CHARACTER 'N' WAS CHOSEN AS THE UNIQUE PATTERN FOR THE VALUE IN THE DELIMITER SIGNATURE FIELD. |

FIG. 11

| Range of $N_{avbits}$ (bits) | Number of LDPC codewords ($N_{CW}$) | LDPC codeword length $L_{LDPC}$ (bits) |
|---|---|---|
| $N_{avbits} \leq 648$ | 1 | 1296, if $N_{avbits} \geq N_{pld} + 912 \times (1-R)$<br>648, otherwise |
| $648 < N_{avbits} \leq 1296$ | 1 | 1944, if $N_{avbits} \geq N_{pld} + 1464 \times (1-R)$<br>1296, otherwise |
| $1296 < N_{avbits} \leq 1944$ | 1 | 1944 |
| $1944 < N_{avbits} \leq 2592$ | 2 | 1944, if $N_{avbits} \geq N_{pld} + 2916 \times (1-R)$<br>1296, otherwise |
| $2592 < N_{avbits}$ | $\left\lceil \dfrac{N_{pld}}{1944 \cdot R} \right\rceil$ | 1944 |

FIG. 13

HYBRID AUTOMATIC REPEAT REQUESTS IN A WIRELESS LOCAL AREA NETWORK

CROSS-REFERENCE TO RELATED APPLICATION

This application claims the benefit of U.S. Provisional Patent Application No. 62/886,264, filed Aug. 13, 2019 and U.S. Provisional Patent Application No. 62/886,866, filed Aug. 14, 2019, which are incorporated by reference herein in their entirety.

TECHNICAL FIELD

The present disclosure generally relates to wireless communications, and more specifically, relates to Hybrid Automatic Repeat Requests (HARQs) in a wireless local area network.

BACKGROUND ART

Institute of Electrical and Electronics Engineers (IEEE) 802.11 is a set of physical and Media Access Control (MAC) specifications for implementing Wireless Local Area Network (WLAN) communications. These specifications provide the basis for wireless network products using the Wi-Fi brand managed and defined by the Wi-Fi Alliance. The specifications define the use of the 2.400-2.500 GHz as well as the 4.915-5.825 GHz bands. These spectrum bands are commonly referred to as the 2.4 GHz and 5 GHz bands. Each spectrum is subdivided into channels with a center frequency and bandwidth. The 2.4 GHz band is divided into 14 channels spaced 5 MHz apart, though some countries regulate the availability of these channels. The 5 GHz band is more heavily regulated than the 2.4 GHz band and the spacing of channels varies across the spectrum with a minimum of a 5 MHz spacing dependent on the regulations of the respective country or territory.

WLAN devices are currently being deployed in diverse environments. These environments are characterized by the existence of many Access Points (APs) and non-AP stations (STAs) in geographically limited areas. Increased interference from neighboring devices gives rise to performance degradation. Additionally, WLAN devices are increasingly required to support a variety of applications such as video, cloud access, and offloading. Video traffic, in particular, is expected to be the dominant type of traffic in WLAN deployments. With the real-time requirements of some of these applications, WLAN users demand improved performance.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 6 shows a table comparing various iterations of Institute of Electrical and Electronics Engineers (IEEE) 802.11 standard, in accordance with some embodiments of the present disclosure.

FIG. 7 shows a table, which describes fields of an Extreme High Throughput (EHT) frame format, in accordance with some embodiments of the present disclosure.

FIG. 11 shows a table describing the fields of an MPDU delimiter, in accordance with some embodiments of the present disclosure.

FIG. 13 shows a table that compares numbers of available bits $N_{avbits}$, numbers of LDPC codewords to be transmitted $N_{CW}$, and lengths of the codewords to be used $L_{LDPC}$, in accordance with some embodiments of the present disclosure.

DETAILED DESCRIPTION

Figure 1:
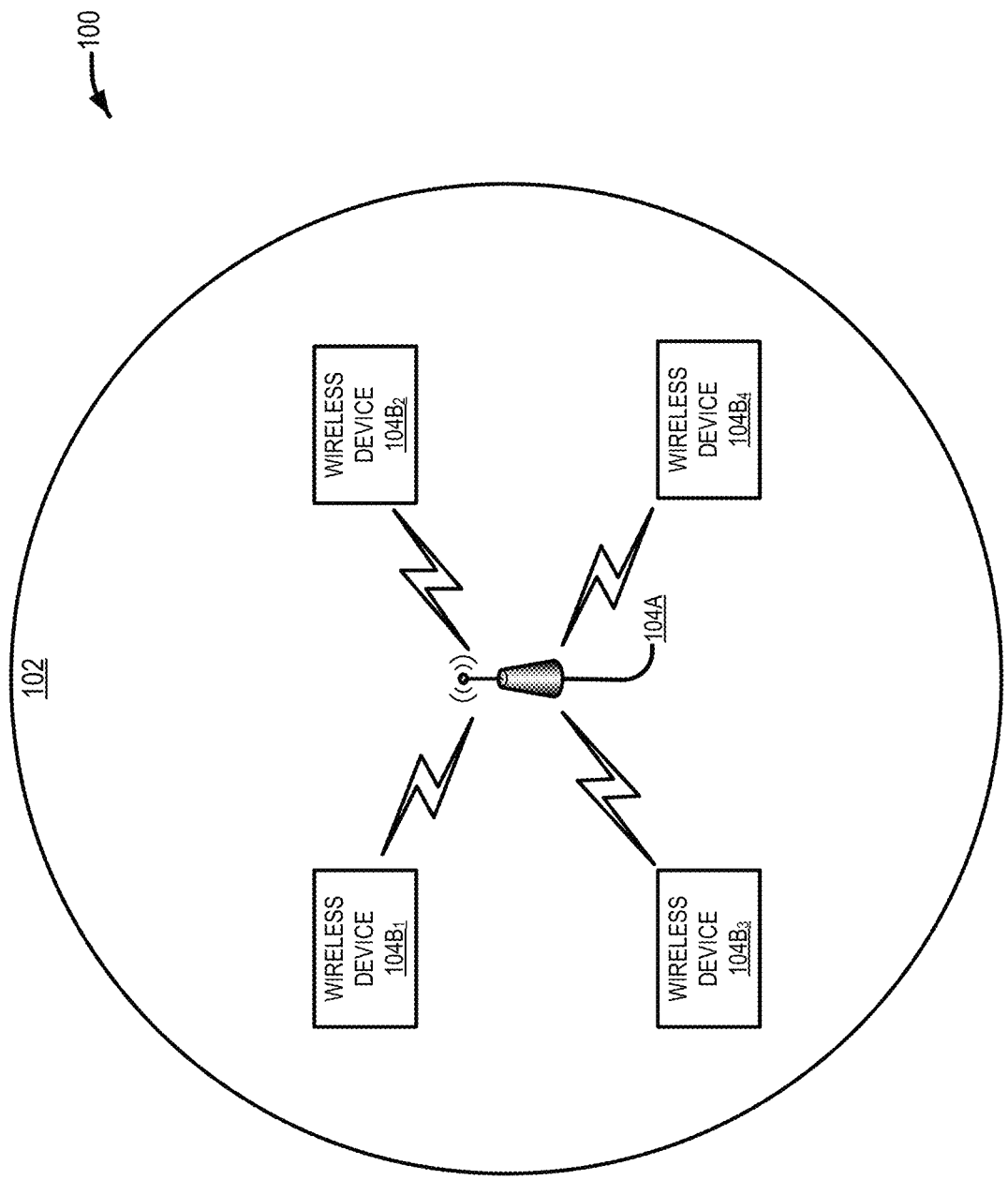
FIG. 1 illustrates an example wireless local area network (WLAN) with a basic service set (BSS) that includes a plurality of wireless devices, in accordance with some embodiments of the present disclosure.

The present disclosure generally relates to wireless communications, and more specifically, relates to Hybrid Automatic Repeat Requests (HARQs) in a wireless local area network.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 shows a wireless local area network (WLAN) 100 with a basic service set (BSS) 102 that includes a plurality of wireless devices 104 (sometimes referred to as WLAN devices 104). Each of the wireless devices 104 may include a medium access control (MAC) layer and a physical (PHY) layer according to an IEEE (Institute of Electrical and Electronics Engineers) standard 802.11, including one or more of the amendments (e.g., 802.11a/b/g/n/p/ac/ax/bd/be). In one embodiment, the MAC layer of a wireless device 104 may initiate transmission of a frame to another wireless device 104 by passing a PHY-TXSTART.request (TXVECTOR) to the PHY layer. The TXVECTOR provides parameters for generating and/or transmitting a corresponding frame. Similarly, a PHY layer of a receiving wireless device may generate an RXVECTOR, which includes parameters of a received frame and is passed to a MAC layer for processing.

The plurality of wireless devices 104 may include a wireless device 104A that is an access point (sometimes referred to as an AP station or AP STA) and the other wireless devices $104B_1$-$104B_4$ that are non-AP stations (sometimes referred to as non-AP STAs). Alternatively, all the plurality of wireless devices 104 may be non-AP STAs in an ad-hoc networking environment. In general, the AP STA (e.g., wireless device 104A) and the non-AP STAs (e.g., wireless devices $104B_1$-$104B_4$) may be collectively referred to as STAs. However, for ease of description, only the non-AP STAs may be referred to as STAs. Although shown with four non-AP STAs (e.g., the wireless devices $104B_1$-$104B_4$), the WLAN 100 may include any number of non-AP STAs (e.g., one or more wireless devices 104B).

Figure 2:
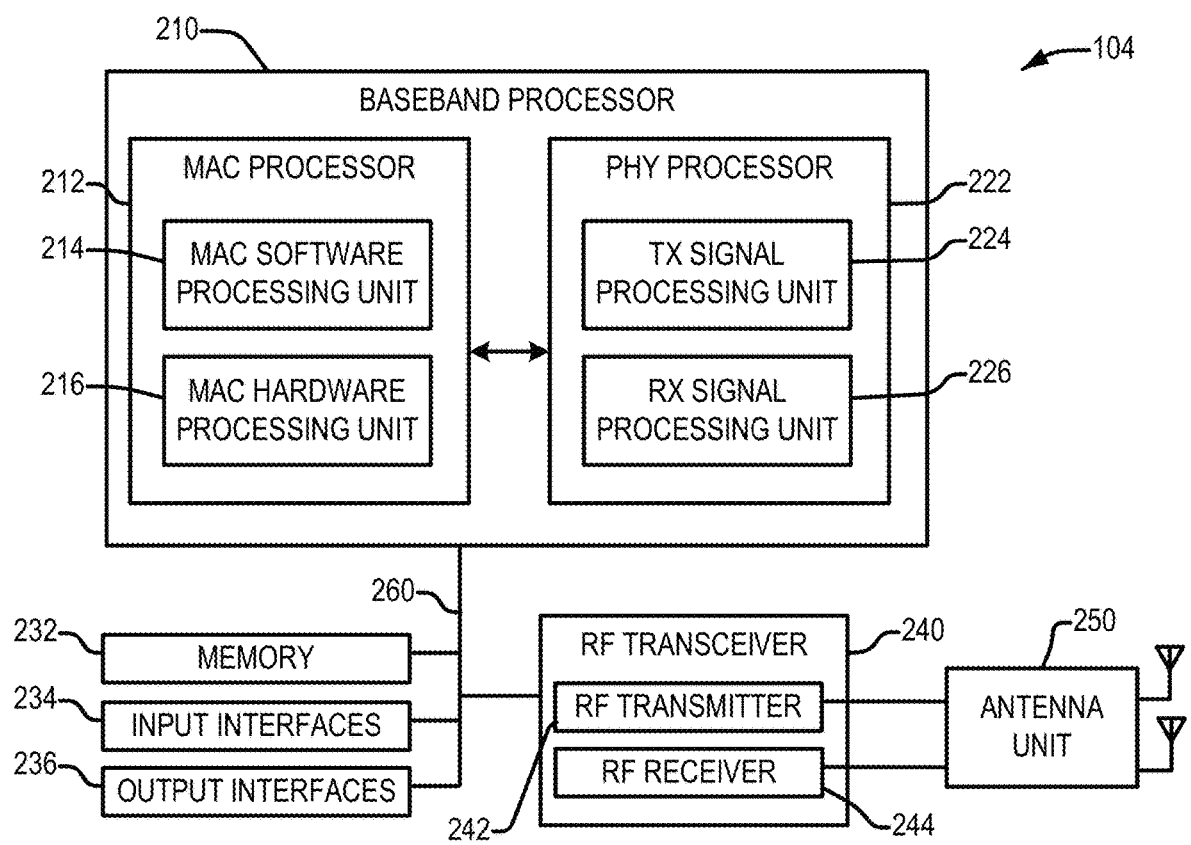
FIG. 2 is a schematic diagram of a wireless device, in accordance with some embodiments of the present disclosure.

FIG. 2 illustrates a schematic block diagram of a wireless device 104, according to an embodiment. The wireless device 104 may be the wireless device 104A (i.e., the AP of the WLAN 100) or any of the wireless devices $104B_1$-$104B_4$ FIG. 1. The wireless device 104 includes a baseband processor 210, a radio frequency (RF) transceiver 240, an antenna unit 250, a storage device (e.g., memory) 232, one or more input interfaces 234, and one or more output interfaces 236. The baseband processor 210, the storage device 232, the input interfaces 234, the output interfaces 236, and the RF transceiver 240 may communicate with each other via a bus 260.

The baseband processor 210 performs baseband signal processing and includes a MAC processor 212 and a PHY processor 222. The baseband processor 210 may utilize the memory 232, which may include a non-transitory computer/machine readable medium having software (e.g., computer/machine programing instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the storage device 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting (TX) signal processing unit (SPU) 224 and a receiving (RX) SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like. Functions performed by the receiving SPU 226 may include inverses of the functions performed by the transmitting SPU 224, such as GI removal, Fourier Transform computation, and the like.

The RF transceiver 240 includes an RF transmitter 242 and an RF receiver 244. The RF transceiver 240 is configured to transmit first information received from the baseband processor 210 to the WLAN 100 (e.g., to another WLAN device 104 of the WLAN 100) and provide second information received from the WLAN 100 (e.g., from another WLAN device 104 of the WLAN 100) to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beamformed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, microphone, and the like. The output interfaces 236 may include one or more of a display device, touch screen, speaker, and the like.

As described herein, many functions of the WLAN device 104 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, etc.

As described herein, a wide variety of electronic devices, circuits, firmware, software, and combinations thereof may be used to implement the functions of the components of the WLAN device 104. Furthermore, the WLAN device 104 may include other components, such as application processors, storage interfaces, clock generator circuits, power supply circuits, and the like, which have been omitted in the interest of brevity.

Figure 3A:
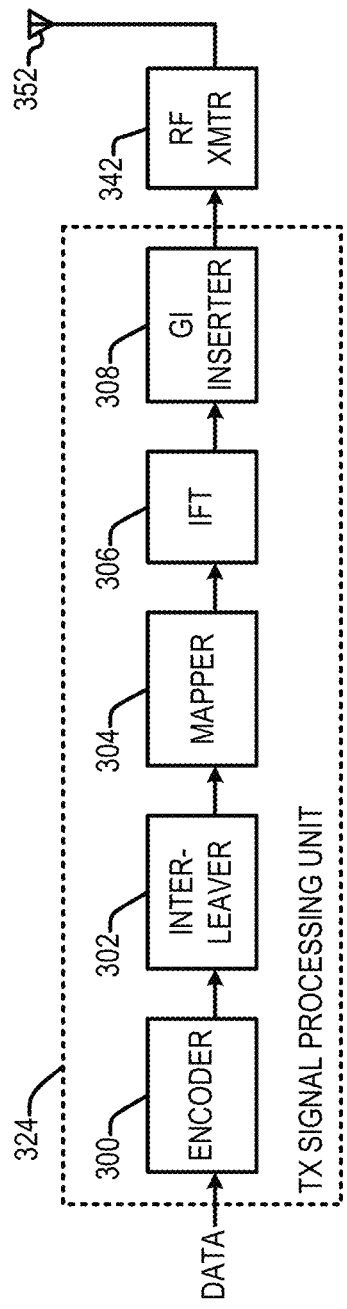
FIG. 3A illustrates components of a wireless device configured to transmit data, in accordance with some embodiments of the present disclosure.

FIG. 3A illustrates components of a WLAN device 104 configured to transmit data according to an embodiment, including a transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data. In an embodiment, the encoder 300 includes a forward error correction (FEC) encoder. The FEC encoder may include a binary convolution code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs BCC encoding and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to constellation mapping.

When the TxSP 324 performs a MIMO or MU-MIMO transmission, the TxSP 324 may include a plurality of interleavers 302 and a plurality of mappers 304 according to a number of spatial streams (NSS) of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number of space-time streams (NSTS) and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol that the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

Figure 3B:
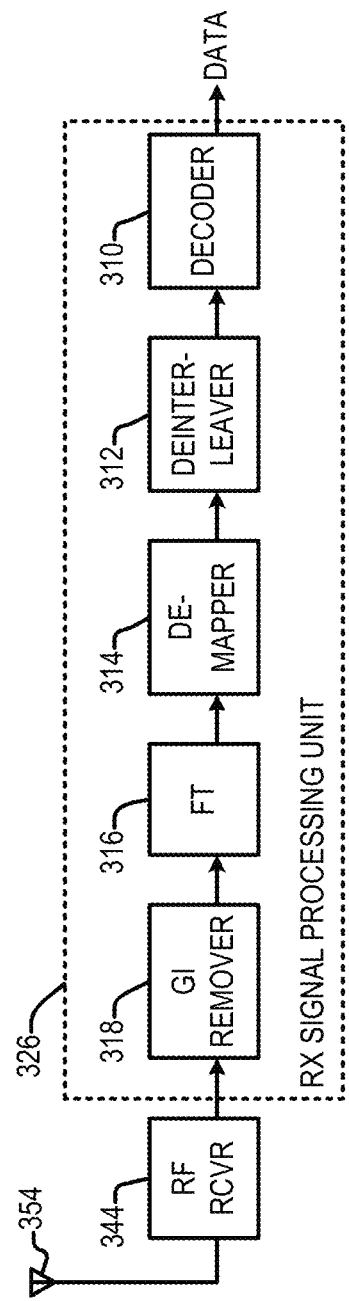
FIG. 3B illustrates components of a wireless device configured to receive data, in accordance with some embodiments of the present disclosure.

FIG. 3B illustrates components of a WLAN device 104 configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 312 includes an FEC decoder. The FEC decoder may include a BCC decoder or an LDPC decoder.

The RxSP 326 may further include a descrambler for descrambling the decoded data. When the decoder 310 performs BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 104 will assess the availability of the wireless medium using Clear Channel Assessment (CCA). If the medium is occupied, CCA may determine that it is busy, while if the medium is available, CCA determines that it is idle.

The PHY entity for IEEE 802.11 is based on Orthogonal Frequency Division Multiplexing (OFDM) or Orthogonal Frequency Division Multiple Access (OFDMA). In either OFDM or OFDMA Physical (PHY) layers, a STA (e.g., a wireless device 104) is capable of transmitting and receiving Physical Layer (PHY) Protocol Data Units (PPDUs) that are compliant with the mandatory PHY specifications. A PHY specification defines a set of Modulation and Coding Schemes (MCS) and a maximum number of spatial streams. Some PHY entities define downlink (DL) and uplink (UL) Multi-User (MU) transmissions having a maximum number of space-time streams (STS) per user and employing up to a predetermined total number of STSs. A PHY entity may provide support for 10 MHz, 20 MHz, 40 MHz, 80 MHz, 160 MHz, 240 MHz, and 320 MHz contiguous channel widths and support for an 80+80, 80+160 MHz, and 160+160 MHz non-contiguous channel width. Each channel includes a plurality of subcarriers, which may also be referred to as tones. A PHY entity may define signaling fields denoted as Legacy Signal (L-SIG), Signal A (SIG-A), and Signal B (SIG-B), and the like within a PPDU by which some necessary information about PHY Service Data Unit (PSDU) attributes are communicated. The descriptions below, for sake of completeness and brevity, refer to OFDM-based 802.11 technology. Unless otherwise indicated, a station refers to a non-AP STA.

Figure 4:
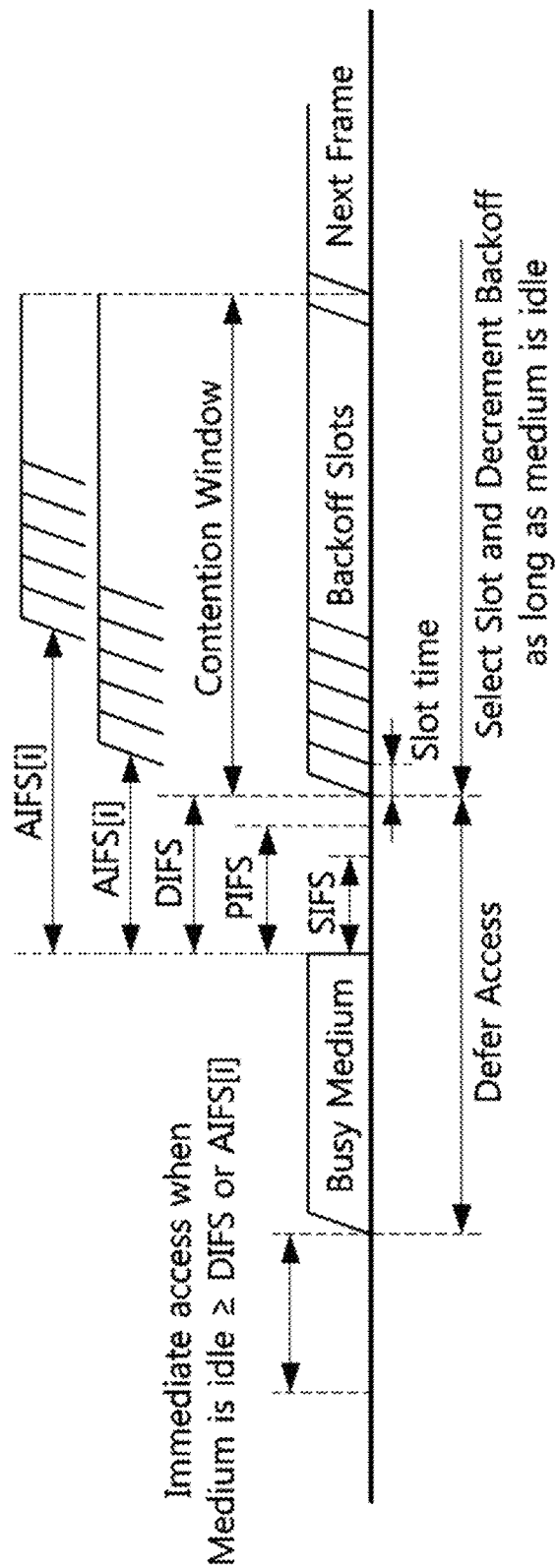
FIG. 4 illustrates Inter-Frame Space (IFS) relationships, in accordance with some embodiments of the present disclosure.

FIG. 4 illustrates Inter-Frame Space (IFS) relationships. In particular, FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 4 also illustrates a slot time and a data frame is used for transmission of data forwarded to a higher layer. As shown, a WLAN device 104 transmits the data frame after performing backoff if a DIFS has elapsed during which the medium has been idle.

A management frame may be used for exchanging management information, which is not forwarded to the higher layer. Subtype frames of the management frame include a beacon frame, an association request/response frame, a probe request/response frame, and an authentication request/response frame.

A control frame may be used for controlling access to the medium. Subtype frames of the control frame include a request to send (RTS) frame, a clear to send (CTS) frame, and an acknowledgement (ACK) frame.

When the control frame is not a response frame of another frame, the WLAN device 104 transmits the control frame after performing backoff if a DIFS has elapsed during which the medium has been idle. When the control frame is the response frame of another frame, the WLAN device 104 transmits the control frame after a SIFS has elapsed without performing backoff or checking whether the medium is idle.

A WLAN device 104 that supports Quality of Service (QoS) functionality (that is, a QoS STA) may transmit the frame after performing backoff if an AIFS for an associated access category (AC) (i.e., AIFS[AC]) has elapsed. When transmitted by the QoS STA, any of the data frame, the management frame, and the control frame, which is not the response frame, may use the AIFS[AC] of the AC of the transmitted frame.

A WLAN device 104 may perform a backoff procedure when the WLAN device 104 that is ready to transfer a frame finds the medium busy. The backoff procedure includes determining a random backoff time composed of N backoff slots, where each backoff slot has a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device 104 detects no medium activity for the duration of a particular backoff slot, the backoff procedure shall decrement the backoff time by the slot time. When the WLAN device 104 determines that the medium is busy during a backoff slot, the backoff procedure is suspended until the medium is again determined to be idle for the duration of a DIFS or EIFS period. The WLAN device 104 may perform transmission or retransmission of the frame when the backoff timer reaches zero.

The backoff procedure operates so that when multiple WLAN devices 104 are deferring and execute the backoff procedure, each WLAN device 104 may select a backoff time using a random function and the WLAN device 104 that selects the smallest backoff time may win the contention, reducing the probability of a collision.

Figure 5:
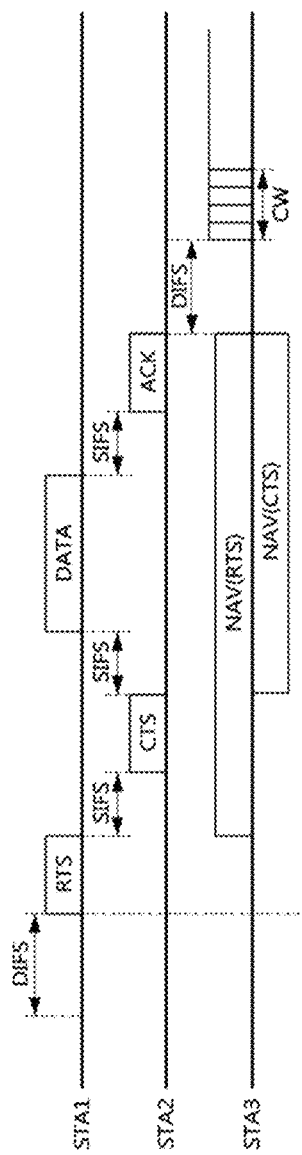
FIG. 5 illustrates a Carrier Sense Multiple Access/Collision Avoidance (CSMA/CA) based frame transmission procedure, in accordance with some embodiments of the present disclosure.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1 can be received, a frame transmitted from the second station STA2 can be received, or both can be received. The stations STA1, STA2, and STA3 may be WLAN devices 104 of FIG. 1.

The station STA1 may determine whether the channel is busy by carrier sensing. The station STA1 may determine channel occupation/status based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the station STA1 may transmit a Request-To-Send (RTS) frame to the station STA2. Upon receiving the RTS frame, after a SIFS the station STA2 may transmit a Clear-To-Send (CTS) frame as a response to the RTS frame. If Dual-CTS is enabled and the station STA2 is an AP, the AP may send two CTS frames in response to the RTS frame (e.g., a first CTS frame in a non-High Throughput format and a second CTS frame in the HT format).

When the station STA3 receives the RTS frame, it may set a NAV timer of the station STA3 for a transmission duration of subsequently transmitted frames (for example, a duration of SIFS+CTS frame duration+SIFS+ data frame duration+ SIFS+ ACK frame duration) using duration information included in the RTS frame. When the station STA3 receives the CTS frame, it may set the NAV timer of the station STA3 for a transmission duration of subsequently transmitted frames using duration information included in the CTS frame. Upon receiving a new frame before the NAV timer expires, the station STA3 may update the NAV timer of the station STA3 by using duration information included in the new frame. The station STA3 does not attempt to access the channel until the NAV timer expires.

When the station STA1 receives the CTS frame from the station STA2, it may transmit a data frame to the station STA2 after a SIFS period elapses from a time when the CTS frame has been completely received. Upon successfully receiving the data frame, the station STA2 may transmit an ACK frame as a response to the data frame after a SIFS period elapses.

When the NAV timer expires, the third station STA3 may determine whether the channel is busy using the carrier sensing. Upon determining that the channel is not used by other devices during a DIFS period after the NAV timer has expired, the station STA3 may attempt to access the channel after a contention window elapses according to a backoff process.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame. FIG. 5 shows the station STA2 transmitting an ACK frame to acknowledge the successful reception of a frame by the recipient.

With clear demand for higher peak throughput/capacity in a WLAN, a new working group has been assembled to generate an amendment to IEEE 802.11. This amendment is called IEEE 802.11be (i.e., Extreme High Throughput (EHT)) and was created to support an increase to the peak PHY rate of a corresponding WLAN. Considering IEEE 802.11b through 802.11ac, the peak PHY rate has been increased by 5× to 11× as shown in FIG. 6, which presents a table 600 comparing various iterations of IEEE 802.11. In case of IEEE 802.11ax, the 802.11ax working group focused on improving efficiency, not peak PHY rate in dense environments. The maximum PHY rate (A Gbps) and PHY rate enhancement (Bx) for IEEE 802.11be could rely on the highest MCS (e.g., 4,096 QAM and its code rate).

The focus of IEEE 802.11be is primarily on WLAN indoor and outdoor operation with stationary and pedestrian speeds in the 2.4, 5, and 6 GHz frequency bands. In addition to peak PHY rate, different candidate features are under discussion. These candidate features include (1) a 320 MHz bandwidth and a more efficient utilization of a non-contiguous spectrum, (2) multi-band/multi-channel aggregation and operation, (3) 16 spatial streams and Multiple Input Multiple Output (MIMO) protocol enhancements, (4) multi-Access Point (AP) Coordination (e.g., coordinated and joint transmission), (5) an enhanced link adaptation and retransmission protocol (e.g., Hybrid Automatic Repeat Request (HARQ)), and (6) adaptation to regulatory rules specific to a 6 GHz spectrum.

Some features, such as increasing the bandwidth and the number of spatial streams, are solutions that have been proven to be effective in previous projects focused on increasing link throughput and on which feasibility demonstration is achievable With respect to operational bands (e.g., 2.4/5/6 GHz) for IEEE 802.11be, more than 1 GHz of additional unlicensed spectrum is likely to be available because the 6 GHz band (5.925-7.125 GHz) is being considered for unlicensed use. This would allow APs and STAs to become tri-band devices. Lager than 160 MHz data transmissions (e.g., 320 MHz) could be considered to increase the maximum PHY rate. For example, 320 MHz or 160+160 MHz data could be transmitted in the 6 GHz band. For example, 160+160 MHz data could be transmitted across the 5 and 6 GHz bands.

In some embodiments, a transmitting STA generates a PPDU frame and transmits it to a receiving STA. The receiving STA receives, detects, and processes the PPDU. The PPDU can be an EHT PPDU that includes a legacy part (e.g., a legacy short training field (L-STF), a legacy long training field (L-LTF), and a legacy signal (L-SIG) field), an EHT signal A field (EHT-SIG-A), an EHT signal B field (EHT-SIG-B), an EHT hybrid automatic repeat request field (EHT-HARQ), an EHT short training field (EHT-STF), an EHT long training field (EHT-LTF), and an EHT-DATA field. FIG. 7 includes a table 700, which describes fields of an EHT frame format. In particular, table 700 describes various fields that may be within the PHY preamble, data field, and midamble of an EHT frame format. For example, table 700 includes definitions 702, durations 704, Discrete Fourier transform (DFTs) periods 706, guard intervals (GIs) 708, and subcarrier spacings 710 for one or more of a legacy short training field (L-STF) 712, legacy long training field (L-LTF) 714, legacy signal field (L-SIG) 716, repeated L-SIG (RL-SIG) 718, universal signal field (U-SIG) 720, EHT signal field (EHT-SIG) 722, EHT hybrid automatic repeat request field (EHT-HARQ) 724, EHT short training field (EHT-STF) 726, EHT long training field (EHT-LTF) 728, EHT data field 730, and EHT midamble field (EHT-MA) 732.

The distributed nature of a channel access network, such as in IEEE 802.11 wireless networks, makes carrier sensing mechanisms important for collision free operation. The physical carrier sensing mechanism of one STA is responsible for detecting the transmissions of other STAs. However, it may be impossible to detect every single case in some circumstances. For example, one STA which may be a long distance away from another STA may see the medium as idle and begin transmitting a frame while the other STA is also transmitting. To overcome this hidden node, a network allocation vector (NAV) may be used. However, as wireless networks evolve to include simultaneous transmission/reception to/from multiple users within a single basic service set (BSS), such as uplink(UL)/downlink(DL) multi-user (MU) transmissions in a cascading manner, a mechanism may be needed to allow for such a situation. As used herein, a multi-user (MU) transmission refers to cases that multiple frames are transmitted to or from multiple STAs simultaneously using different resources. Examples of different resources are different frequency resources in OFDMA transmissions and different spatial streams in MU- MIMO transmissions. Therefore, DL-OFDMA, DL-MU-MIMO, UL-OFDMA, and UL-MU-MIMO are examples of MU transmissions.

Wireless network systems can rely on retransmission of media access control (MAC) protocol data units (MPDUs) when the transmitter (TX) does not receive an acknowledgement from the receiver (RX) or MPDUs are not successfully decoded by the receiver. Using an automatic repeat request (ARQ) approach, the receiver discards the last failed MPDU before receiving the newly retransmitted MPDU. With requirements of enhanced reliability and reduced latency, the wireless network system can evolve toward a hybrid ARQ (HARQ) approach.

There are two methods of HARQ processing. In a first type of HARQ scheme, also referred to as chase combining (CC) HARQ (CC-HARQ) scheme, signals to be retransmitted are the same as the signals that previously failed because all subpackets to be retransmitted use the same puncturing pattern. The puncturing is needed to remove some of the parity bits after encoding using an error-correction code. The reason why the same puncturing pattern is used with CC-HARQ is to generate a coded data sequence with forward error correction (FEC) and to make the receiver use a maximum-ratio combining (MRC) to combine the received, retransmitted bits with the same bits from the previous transmission. For example, information sequences are transmitted in packets with a fixed length. At a receiver, error correction and detection are carried out over the whole packet. However, the ARQ scheme may be inefficient in the presence of burst errors. To solve this more efficiently, subpackets are used. In subpacket transmissions, only those subpackets that include errors need to be retransmitted.

Since the receiver uses both the current and the previously received subpackets for decoding data, the error probability in decoding decreases as the number of used subpackets increases. The decoding process passes a cyclic redundancy check (CRC) and ends when the entire packet is decoded without error or the maximum number of subpackets is reached. In particular, this scheme operates on a stop-and-wait protocol such that if the receiver can decode the packet, it sends an acknowledgement (ACK) to the transmitter. When the transmitter receives an ACK successfully, it terminates the HAPQ transmission of the packet. If the receiver cannot decode the packet, it sends a negative acknowledgement (NAK) to the transmitter and the transmitter performs the retransmission process.

In a second type of HARQ scheme, also referred to as an incremental redundancy (IR) HARQ (IR-HARQ) scheme, different puncturing patterns are used for each subpacket such that the signal changes for each retransmitted subpacket in comparison to the originally transmitted subpacket. IR-HARQ alternatively uses two puncturing patterns for odd numbered and even numbered transmissions, respectively. The redundancy scheme of IR-HARQ improves the log likelihood ratio (LLR) of parity bit(s) in order to combine information sent across different transmissions due to requests and lowers the code rate as the additional subpacket is used. This results in a lower error rate of the subpacket in comparison to CC-HARQ. The puncturing pattern used in IR-HARQ is indicated by a subpacket identity (SPID) indication. The SPID of the first subpacket may always be set to 0 and all the systematic bits and the punctured parity bits are transmitted in the first subpacket. Self-decoding is possible when the receiving signal-to-noise ratio (SNR) environment is good (i.e., a high SNR). In some embodiments, subpackets with corresponding SPIDs to be transmitted are in increasing order of SPID but can be exchanged/switched except for the first SPID.

To improve WLAN systems, AP coordination has been discussed as a possible technology to be adopted in IEEE 802.11be, where there is high level classification depending on various AP coordination schemes. For example, there is a first type of technique in which data for a user is sent from a single AP (sometimes referred to as "coordinated") or there is a second type of technique in which data for a user is sent from multiple APs (sometimes referred to as "joint").

For the coordinated AP technique, multiple APs are 1) transmitting on the same frequency resource based on coordination and forming spatial nulls to allow for simultaneous transmission from multiple APs or 2) transmitting on orthogonal frequency resources by coordinating and splitting the spectrum to use the spectrum more efficiently. As for a joint AP technique, multiple APs are transmitting jointly to a given user.

Figure 8:
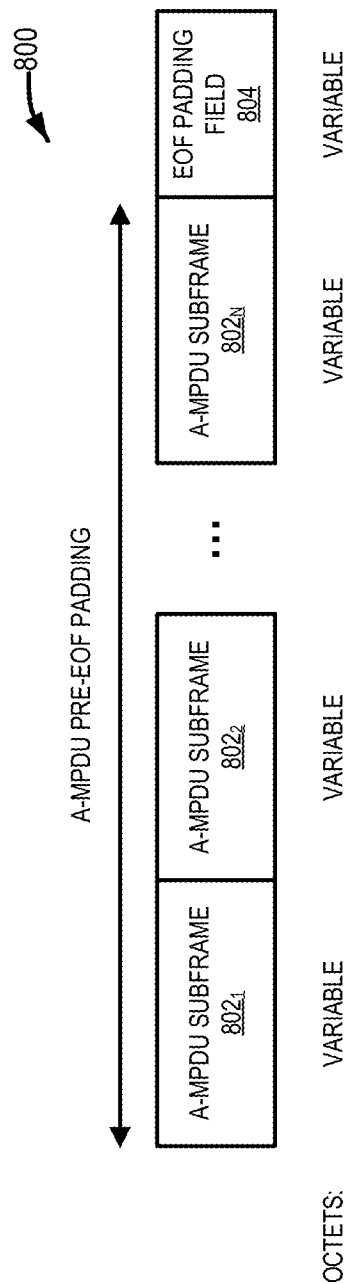
FIG. 8 shows an aggregated media access control (MAC) protocol data unit (A-MPDU), in accordance with some embodiments of the present disclosure.
Figure 9:
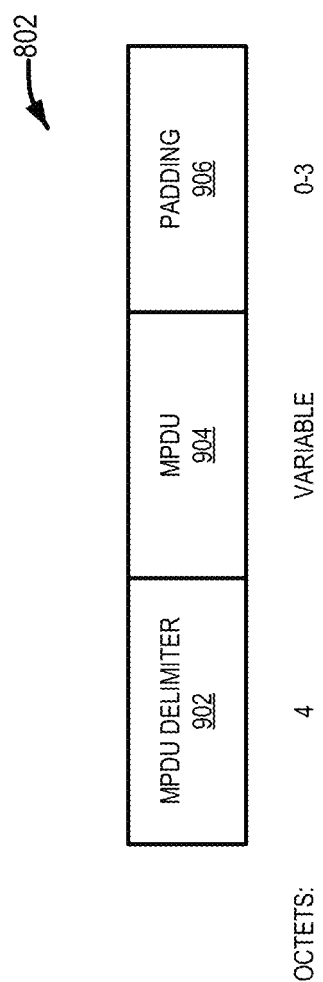
FIG. 9 shows a structure of an A-MPDU subframe, in accordance with some embodiments of the present disclosure.

As shown in FIG. 8, an aggregated media access control (MAC) protocol data unit (A-MPDU) 800 includes a sequence of one or more A-MPDU subframes $802_1$-$802_N$ and a variable amount of end-of-frame (EOF) padding field 804. FIG. 9 shows the structure of an A-MPDU subframe 802, in accordance with one example embodiment. As shown, each A-MPDU subframe 802 can include an MPDU delimiter 902 optionally followed by an MPDU 904. Each nonfinal A-MPDU subframe 802 in an A-MPDU 800 can have padding octets appended (e.g., padding 906) to make the A-MPDU subframe 802 a multiple of four octets in length. The content of these padding octets may be variable.

Figure 10:
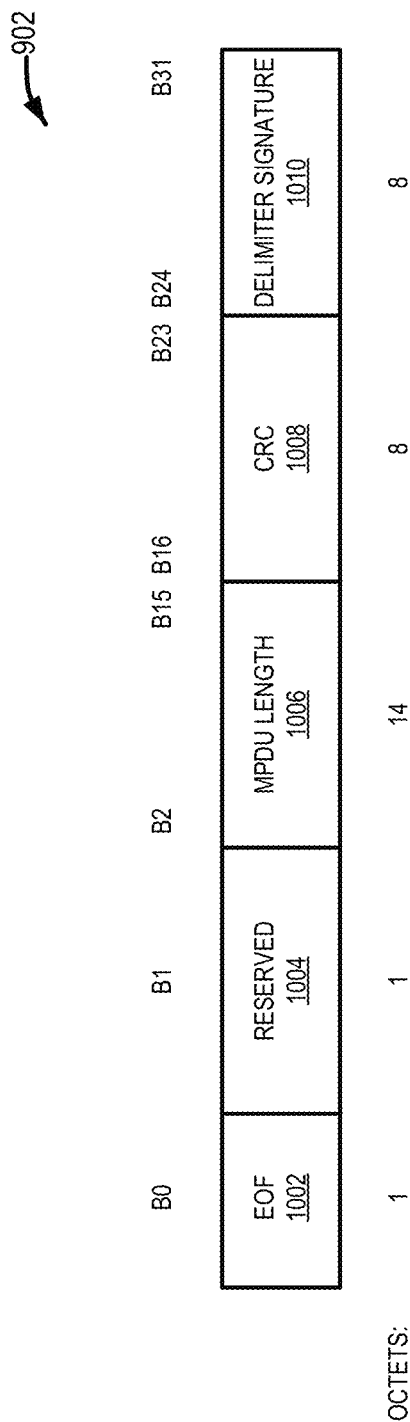
FIG. 10 shows an MPDU delimiter, in accordance with some embodiments of the present disclosure.

FIG. 10 shows an example of an MPDU delimiter 902, in accordance with one example embodiment. The fields of the MPDU delimiter 902 are defined in table 1100 shown in FIG. 11. In particular, the MPDU delimiter of FIG. 10 can include an EOF field 1002, a reserved field 1004, an MPDU length field 1006, a CRC field 1008, and a delimiter signature field 1010. The MPDU delimiter CRC field 1008 is an 8-bit CRC value that may be used as a frame check sequence (FCS) to protect the reserved field 1004 and the MPDU length field 1006.

Figure 12:
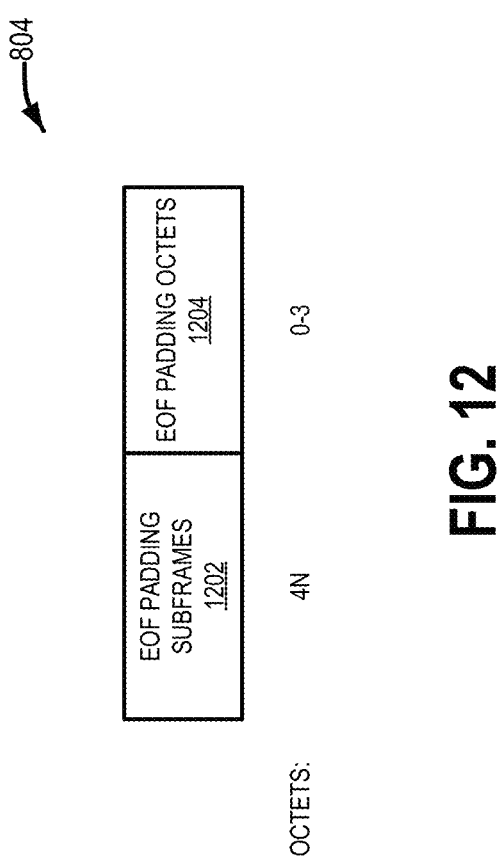
FIG. 12 shows an end-of-frame (EOF) padding field of an A-MPDU, in accordance with some embodiments of the present disclosure.

FIG. 12 shows an EOF padding field 804, in accordance with one example embodiment. As shown in FIG. 12, an EOF padding field 804 includes zero or more EOF padding subframes 1202, which have a length of 4N octets (N is a positive integer value), and 0-3 EOF padding octets 1204. An EOF padding subframe 1202 is an A-MPDU subframe 802 with 0 in a MPDU length field 1006 and 1 in an EOF field 1002. A-MPDU pre-EOF padding refers to the contents of the A-MPDU up to, but not including, the EOF Padding field 804.

Low density parity check (LDPC) codes are a special case of linear block codes (e.g., forward error-correction codes). In linear block codes, the parity bits and message bits have a liner combination, which means that the resultant codeword is the linear combination of any two codewords. Also, forward error correction codes are to augment strings of 0 or 1 bits of a message with deliberately introduced redundancy in the form of extra check bits to produce a codeword for the message. The codeword includes message bits and extra check bits (e.g., parity check bits). These check bits are added in such a way that codewords are distinct from each other and the transmitted message can be correctly decoded at the receiver, when some bits in the codeword are contaminated/lost (e.g., unable to be correctly/successfully decoded) during transmission over a channel.

LDPC codes are block codes defined by a parity check matrix that contain only a very small number of non-zero elements. The parity check matrix is a matrix that explains/provides linear relations of codeword components. Each row of the parity check matrix corresponds to a parity-check equation and each column of a parity check matrix corresponds to a bit in the codeword. The biggest difference between LDPC codes and other block codes is how they are decoded. Most existing block codes are decoded with maximum likelihood (ML) decoding methods/algorithms. ML-based methods are often short and designed algebraically to reduce complexity. However, LDPC codes are decoded iteratively using a graphical representation of their parity check matrix and designed to focus on the properties of parity check matrix.

To encode an LDPC PPDU, some steps are performed in sequence. For example, seven steps are provided below for encoding an LDPC PPDU.

A first step includes computing a number of available bits ($N_{avbits}$) for a minimum number of OFDM symbols in which the data field of a packet may fit. In particular, $N_{avbits}$ may be calculated according to Equation 1 shown below.

$$N_{avbits} = N_{CBPS} \times m_{STBC} \times \left\lceil \frac{N_{pld}}{N_{CBPS} \times R \times m_{STBC}} \right\rceil \quad \text{Equation 1}$$

In Equation 1 shown above, $m_{STBC}$ is 2 if STBC is used and 1 otherwise; $N_{CBPS}$ is a number of coded bits per OFDM symbol; and $N_{pld}$ is the number of bits in the PSDU and SERVICE field and may be set according to Equation 2 shown below.

$$N_{pld} = \text{length} \times 8 + 16 \quad \text{Equation 2}$$

In Equation 2, length is the value of the high throughput (HT) length field in a HT-SIG field or the value of L-LENGTH in L-SIG of the same PPDU if the HT length field is not present.

A second step includes computing an integer number of LDPC codewords to be transmitted ($N_{CW}$) and the length of the codewords to be used ($L_{LDPC}$). In one embodiment, this computation may be performed according to the table shown in FIG. 13. In particular, the table of FIG. 13 compares numbers of available bits $N_{avbits}$, numbers of LDPC codewords to be transmitted $N_{CW}$, and lengths of the codewords to be used $L_{LDPC}$.

A third step includes computing a number of shortening bits ($N_{shrt}$) to be padded to the $N_{pld}$ data bits before encoding. In one embodiment, the number of shortening bits $N_{shrt}$ may be computed according to Equation 3 shown below.

$$N_{shrt} = \max(0, (N_{CW} \times L_{LDPC} \times R) - N_{pld}) \quad \text{Equation 3}$$

In Equation 3, R is the code rate of the frame and when $N_{shrt}$ is 0, shortening is not performed. In some embodiments, $N_{shrt}$ is inherently restricted to be non-negative due to codeword length and count selection of encoding parameters from the table of FIG. 13. When $N_{shrt}$ is greater than 0, shortening bits are equally distributed over all codewords to be transmitted $N_{CW}$ with the first $N_{shrt}$ mod $N_{CW}$ codewords shortened 1 bit more than the remaining codewords. Further, $N_{spcw}$ is defined according to Equation 4 below.

$$N_{spcw} = \lfloor N_{shrt}/N_{CW} \rfloor \quad \text{Equation 4}$$

Based on Equation 4, when $N_{shrt}$ is greater than 0, shortening is performed by setting information bits $^i k - N_{spcw} - 1, \ldots, ^i k - 1$ to 0 in the first $N_{shrt}$ mod $N_{CW}$ codewords and setting information bits $^i k - N_{spcw}, \ldots, ^i k - 1$ to 0 in the remaining codewords. For all values of $N_{shrt}$, each of the $N_{CW}$ codewords are encoded using an LDPC encoding technique described in an IEEE 802.11 specification. When $N_{shrt}$ is greater than 0, shortened bits may be discarded after encoding.

A fourth step may include computing a number of bits to be punctured ($N_{punc}$) from the codewords after encoding. In one embodiment, this computation may be performed according to Equation 5 below.

$$N_{punc} = \max(0, (N_{CW} \times L_{LDPC}) - N_{avbits} - N_{shrt}) \quad \text{Equation 5}$$

If $$\left((N_{punc} > 0.1 \times N_{CW} \times L_{LDPC} \times (1-R)) \text{ AND} \right.$$
$$\left. \left(N_{shrt} < 1.2 \times N_{punc} \times \frac{R}{1-R}\right)\right)$$

is true OR if ($N_{punc} > 0.3 \times N_{CW} \times L_{LDPC} \times (1-R)$) is true, increment $N_{avbits}$ and recompute $N_{punc}$ using Equations 6 and 7

$$N_{avbits} = N_{avbits} + N_{CBPS} \times m_{STBC} \quad \text{Equation 6}$$

$$N_{punc} = \max(0, (N_{CW} \times L_{LDPC}) - N_{avbits} - N_{shrt}) \quad \text{Equation 7}$$

Based on the above, punctured bits are equally distributed over all $N_{CW}$ codewords with the first $N_{punc}$ mod $N_{CW}$ codewords punctured 1 bit more than the remaining codewords. Further, $N_{ppcw}$ is defined according to Equation 8 below.

$$N_{ppcw} = \lfloor N_{punc}/N_{CW} \rfloor \quad \text{Equation 8}$$

When $N_{ppcw}$ is greater than 0, puncturing is performed by discarding parity bits $P_{n-k-N_{ppcw}-1}, \ldots, P_{n-k-1}$ of the first $N_{punc}$ mod $N_{CW}$ codewords and parity bits ($P_{n-k-N_{ppcw}}, \ldots, P_{n-k-1}$) of the remaining codewords are discarded after encoding. The number of OFDM symbols to be transmitted in the PPDU is computed as shown in Equation 9.

$$N_{SYM} = N_{avbits}/N_{CBPS} \quad \text{Equation 9}$$

A fifth step may include computing a number of coded bits to be repeated ($N_{rep}$) as shown in Equation 10 below.

$$N_{rep} = \max(0, N_{avbits} - N_{CW} \times L_{LDPC} \times (1-R) - N_{pld}) \quad \text{Equation 10}$$

Figure 14:
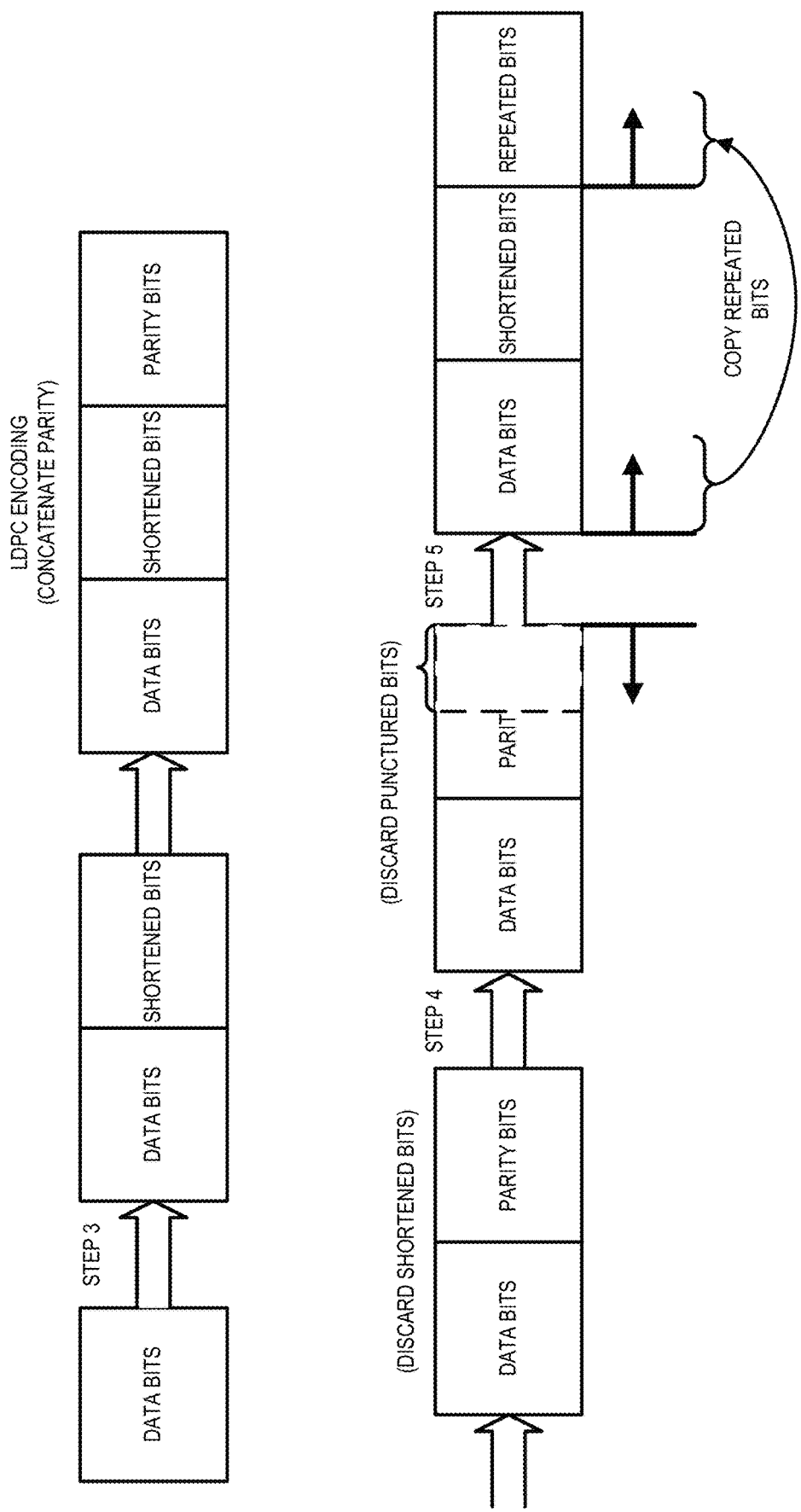
FIG. 14 shows a process for puncturing and padding with repeated bits, in accordance with some embodiments of the present disclosure.

The number of coded bits to be repeated $N_{rep}$ may be equally distributed over all $N_{CW}$ codewords with one more bits repeated for the first $N_{rep}$ mod $N_{CW}$ codewords than for the remaining codewords. Further, when puncturing occurs, the coded bits are not repeated, and vice versa. The coded bits to be repeated for any codeword may be copied only from that codeword itself, starting from information/data bit $i_0$ and continuing sequentially through the information bits and, when necessary, into the parity bits, until the required number of repeated bits is obtained for that codeword. These repeated bits are copied from the codeword after the shortening bits have been removed. If for a codeword the required number of repeated bits are not obtained in this manner (i.e., repeating the codeword once), the procedure is repeated until the required number is achieved. These repeated bits are then concatenated to the codeword after the parity bits in their same order. This process is illustrated in FIG. 14 along with steps 3 and 4 described above. As shown in FIG. 14, the outlined arrows indicate the encoding procedure steps (e.g., steps 3-5), while the solid arrows indicate the direction of puncturing and padding with repeated bits.

A sixth step may include, for each of the $N_{CW}$ codewords, processing data using the number of shortening bits per codeword as computed in step three for encoding and puncture or repeat bits per codeword as computed per step four and step five, as illustrated in FIG. 14.

A seventh step may include aggregating all codewords and parsing. This seventh step may be performed according to an IEEE 802.11 procedure.

Figure 15:
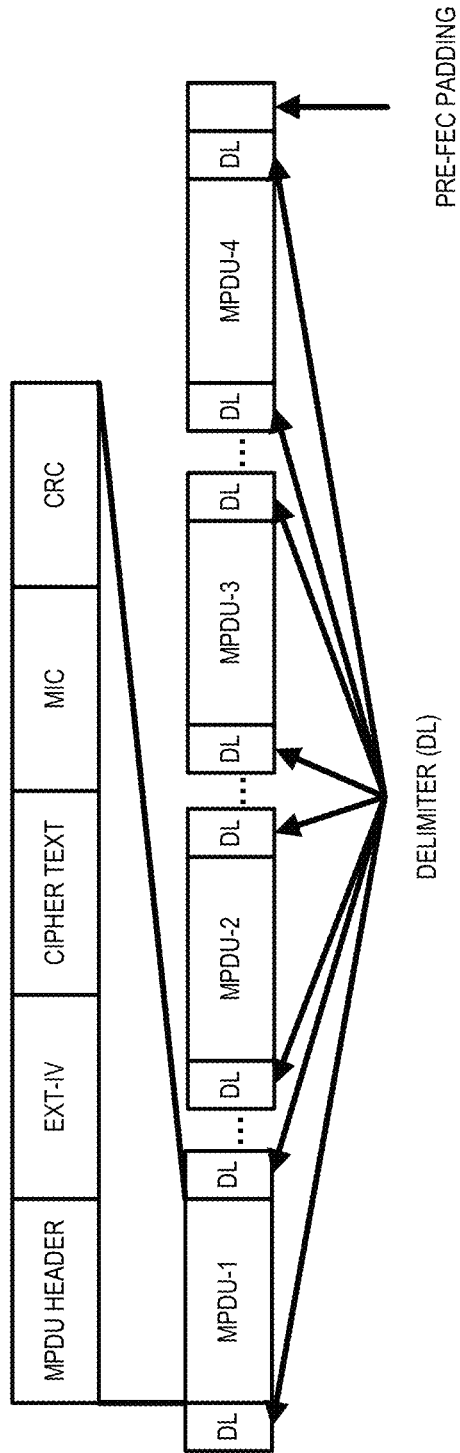
FIG. 15 shows an example of a retransmitted packet structure that includes changed parameters, in accordance with some embodiments of the present disclosure.
Figure 16:
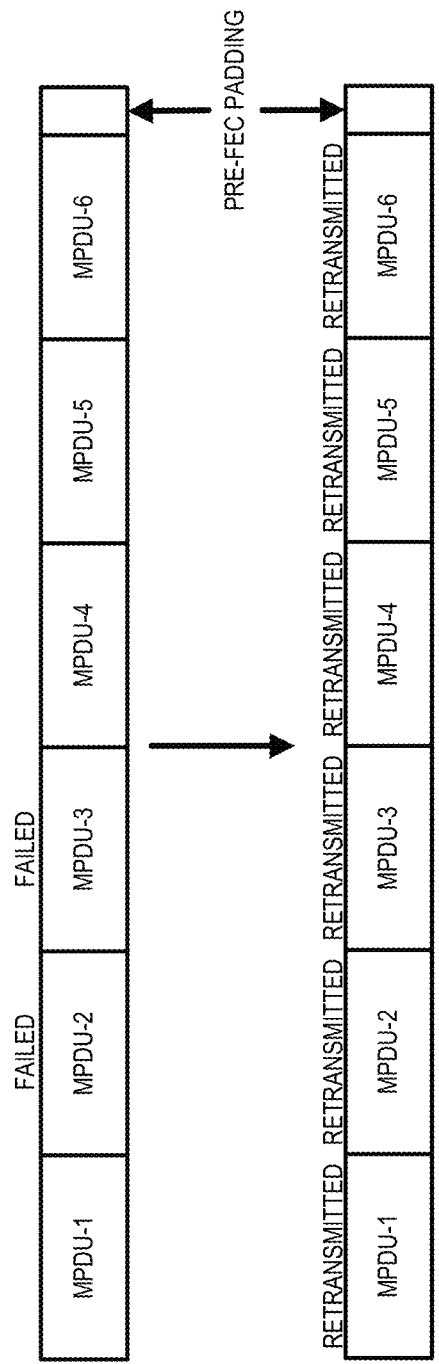
FIG. 16 shows an example of retransmitting an entire A-MPDU, in accordance with some embodiments of the present disclosure.

As noted above, HARQ is a candidate feature for IEEE 802.11be. Various methods of HARQ have been presented herein. In some embodiments, HARQ can be supported at the A-MPDU level, the MPDU level, and/or the codeword level. At the A-MPDU level, when the whole A-MPDU is to be retransmitted, the MAC layer operating within a station prepares the A-MPDU to be retransmitted. However, the MAC layer may change several parameters between the original transmission and the retransmission. FIG. 15 shows an example of a retransmitted packet structure that includes changed parameters. These changed parameters (e.g., MPDU headers flip the retry bit, cipher text, CRC, etc.) results in a different payload at the PHY layer and there is no way that the PHY layer knows the contents of MPDUs and codewords (CWs) after this payload is transformed into codewords for transmission. To solve this, assuming an A-MPDU was transmitted and some of the MPDUs were incorrectly decoded, one solution is to transmit the entire A-MPDU, regardless of which MDPU(s) failed. FIG. 16 shows an example of retransmitting an entire A-MPDU after two MPDUs failed to be received/decoded (e.g., MPDUs 2 and 3).

Figure 17:
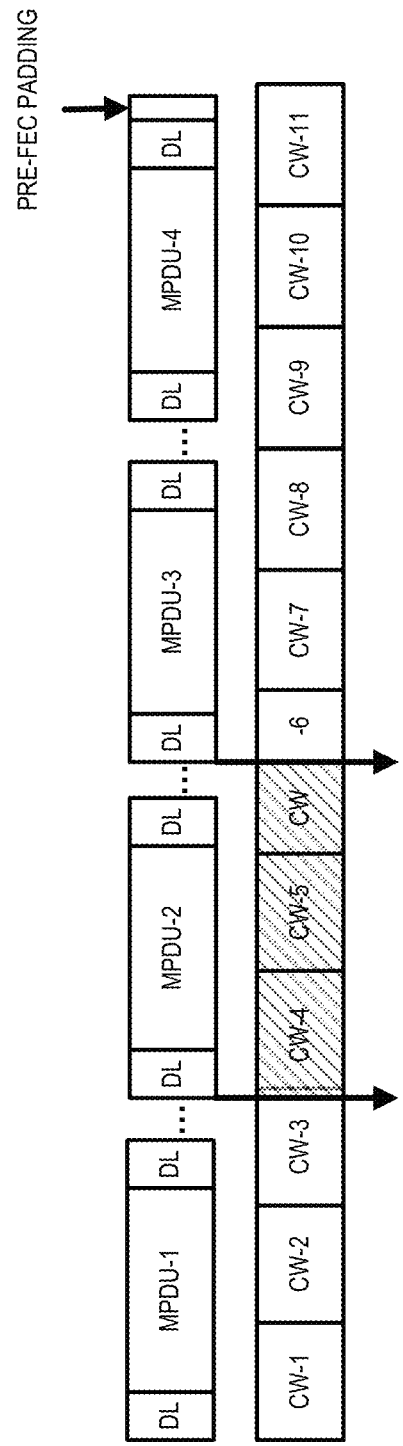
FIG. 17 shows an example of an A-MPDU and corresponding codewords, in accordance with some embodiments of the present disclosure.

In another example embodiment, HARQ is supported at the MPDU level. In this case, MPDU Block Ack (BA) based feedback informs the transmitting station that the failed MPDU (e.g. MPDU-2 in FIG. 17) was not correctly decoded. For example, as shown in FIG. 17, the codewords 4-6, which correspond to the MPDU-2, was not successfully received/decoded.

Figure 18:
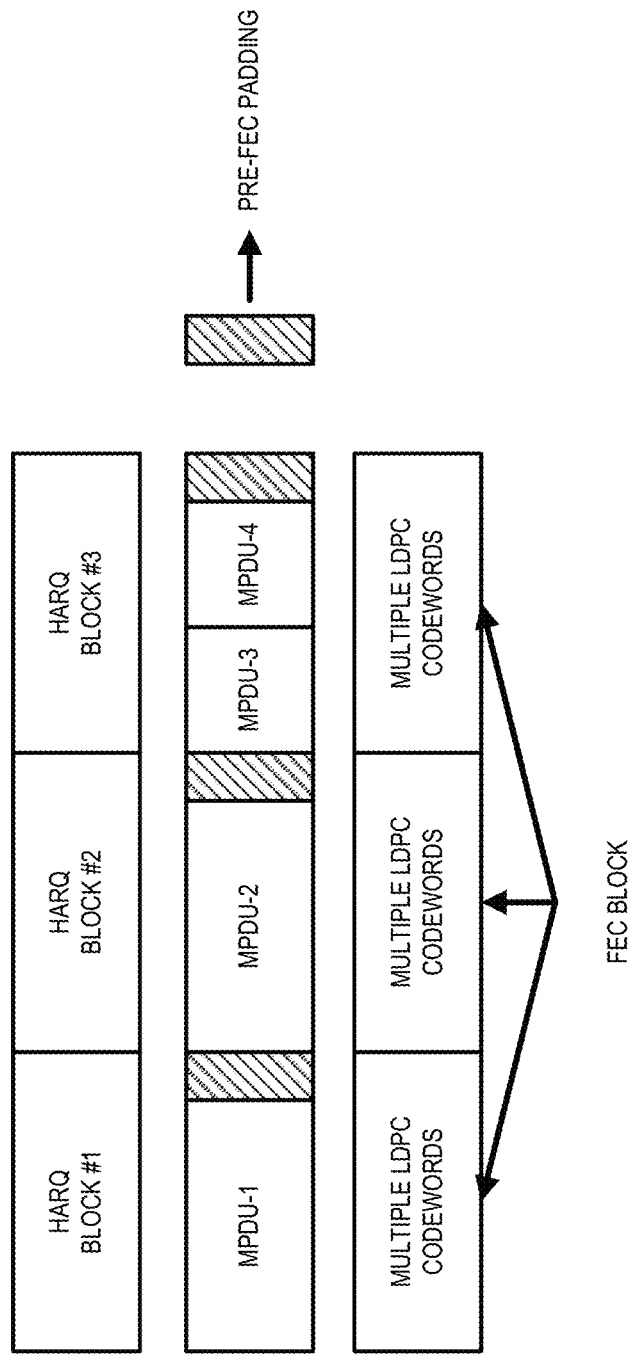
FIG. 18 shows an example of retransmitting MPDU(s) within a Hybrid Automatic Repeat Request (HARQ) block, in accordance with some embodiments of the present disclosure.

Following this indication and retransmission, the receiving station has two partial CWs (e.g., CW-3 and CW-6) and two full CWs (e.g., CW-4 and CW-5). With different CWs of this failed MPDU at a transmitting station, each CW will have different FEC padding. However, this causes misalignment between the failed (i.e., original transmission packet) MPDU's CWs and the retransmitted MPDU's CWs. To solve this, padding can be appended to an MPDU to form a HARQ block. In this method, LDPC is being applied within each HARQ block. FIG. 18 shows an example of retransmitting the MPDU(s) within a HARQ block. However, this technique may incur considerable overhead (e.g., padding towards HARQ block size). Moreover, if small MPDUs are concatenated within a block (e.g., MPDU-3 and MPDU-4 in FIG. 18), a retransmission may contain MPDUs that were properly decoded by the receiving station.

Figure 19:
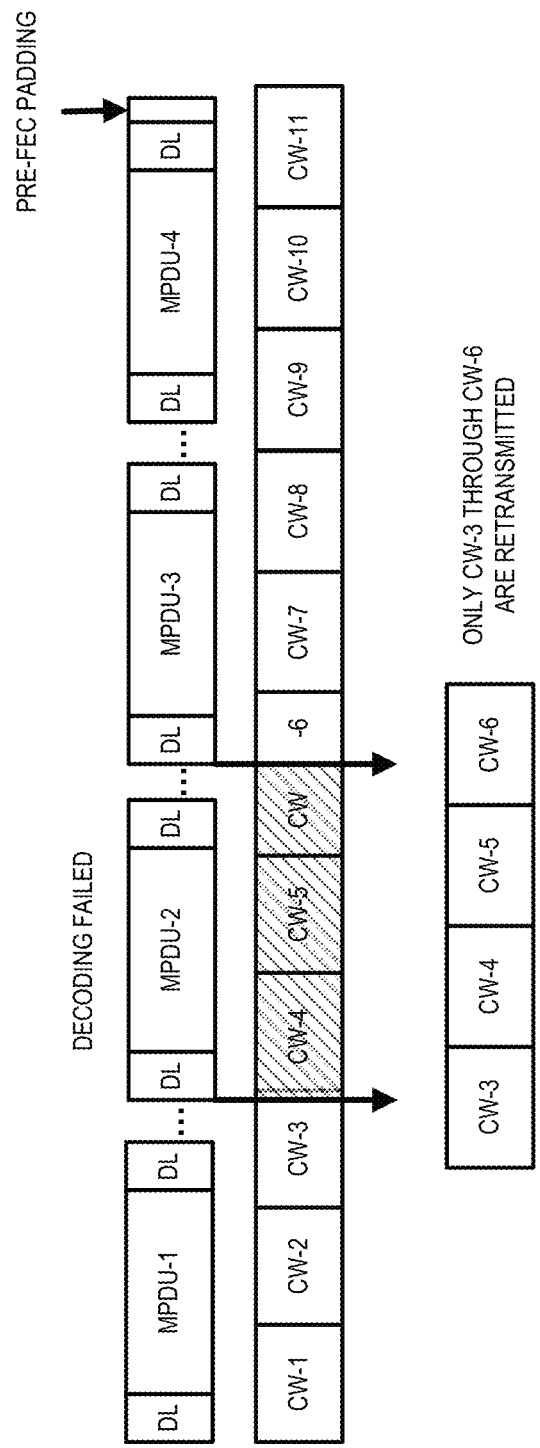
FIG. 19 shows an example of an A-MPDU and corresponding codewords to be retransmitted, in accordance with some embodiments of the present disclosure.

In yet another example embodiment, HARQ is supported at the CW level. In this case, the PHY layer of the receiving station should know where it has received an erroneous codeword for combining with the retransmitted CWs. Moreover, the receiving station sets up a HARQ session between the transmitting station and the receiving station by asking for CWs (e.g. CW-3 through CW-6 in FIG. 19) in the retransmission. Following this indication and the retransmission, the PHY layer of the receiving station combines the retransmitted CWs with the previous CWs (i.e., the original transmission) and forwards the decoded bitstream to the MAC layer. If there is no error in these combined CWs, the MAC layer terminates the HARQ session by sending feedback to the transmitting station.

Figure 20:
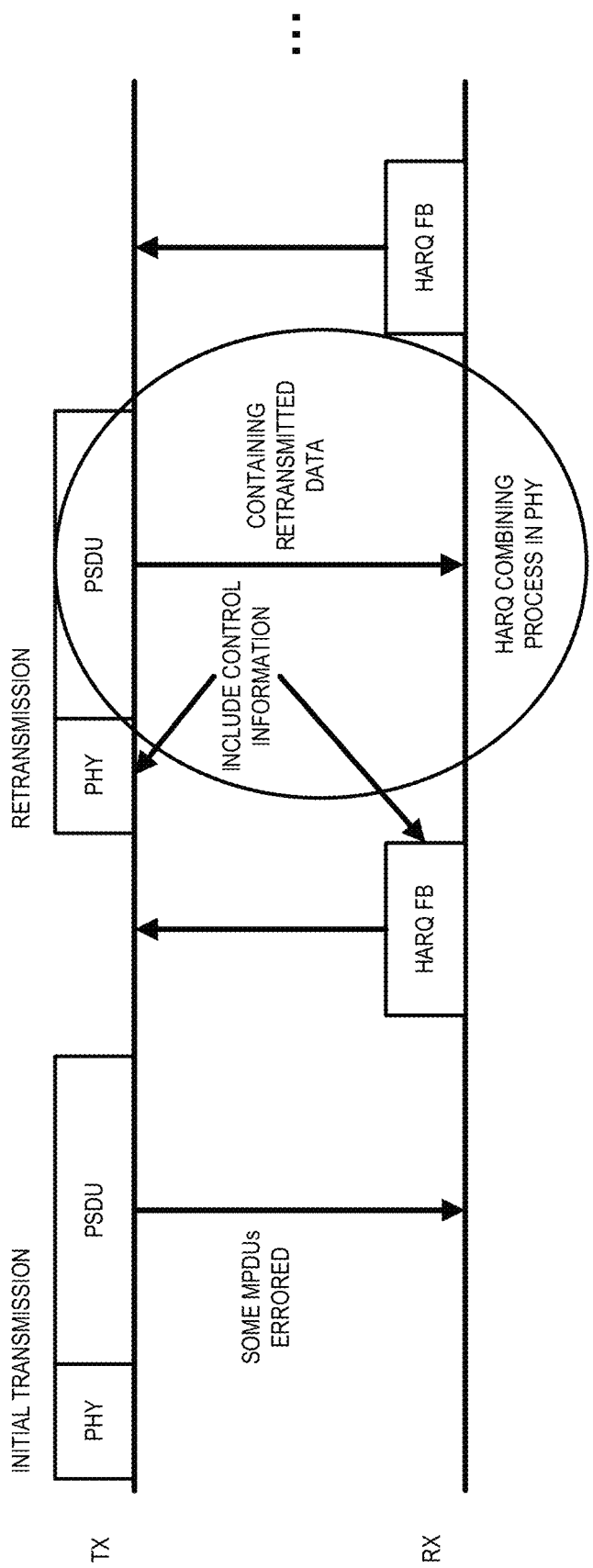
FIG. 20 shows a procedure of a HARQ process between a receiving station and a transmitting station, in accordance with some embodiments of the present disclosure.

In addition to the above examples for supporting HARQ, corresponding control information on the status of data decoding conveyed from the receiving station to the transmitting station (e.g., HARQ feedback) is important. HARQ feedback can be supported at the MPDU level and/or the codeword level to determine/get a portion of data to be retransmitted. After retransmission from the transmitting station to the receiving station, to help a HARQ combining process in the PHY layer of the receiving station, PHY layer retransmission may include control information related to the HARQ feedback. In this case, the size of a SIG field (e.g., 24 bits or 26 bits per OFDM symbol in the SIG field) in a transmission could be a bottleneck with 16 antennas and a 320 MHz bandwidth. FIG. 20 shows a procedure of a HARQ process between a receiving station and a transmitting station, in accordance with one example embodiment.

In one embodiment, a PPDU includes a control information field for indicating information related to a HARQ process. In some embodiments, the control information field indicates a first state if signaling overhead is beyond a first threshold. In particular, when HARQ feedback indicates that the number of failed units (e.g., A-MPDUs, MPDUs, or CWs) is beyond a specific threshold, the control information field indicates the entire data portion/PPDU is required to be retransmitted. For example, a receiving station may determine that value-α portion of a packet was not decoded correctly and a is greater than the threshold. In this case, the control information field indicates that the entire packet/PPDU needs to be retransmitted. In one embodiment, the control information field is in a MAC portion of the PPDU. For example, the control information field could be in a MAC portion of a PPDU as a feedback from a receiving station related to an originally received PPDU. In another embodiment, the control information field could be in a PHY preamble portion of the PPDU. For example, the control information field could be in a PHY preamble portion of a PPDU that is being retransmitted. In either of these examples, the control information field in either a MAC portion and/or a PHY preamble portion indicates that the entire packet/PPDU needs to be retransmitted and not a portion of the PPDU when a threshold is met or exceeded.

In one embodiment, the control information field could be in a signal field(s) following L-SIG and RL-SIG and has 24 or 26 bits per each signal field. For example, the signal field could be SIG-A of a PPDU. In another example, the signal field could be SIG-B of a PPDU and the control information field could be dedicated for a specific user (e.g., the entire data portion to be assigned for a specific user needs to be retransmitted). In some embodiments, L-SIG and RL-SIG includes 24-bits of information.

In some embodiments, a is a pre-defined value between a receiving station and a transmitting station. In some embodiments, a could be shared between stations as a capabilities element shared by one or more of the receiving and transmitting stations.

In some embodiments, the control information field could indicate that a first half portion of the initial PPDU could be indicated to be retransmitted in a subsequent PPDU when a specific portion of the first half includes failed data. In some embodiments, the control information field could indicate that a last half portion of an initial PPDU is to be retransmitted when a specific portion of the last half includes failed data. In some embodiments, the control information field may include a block unit indication that could be applied to indicate blocks to be retransmitted. For example, an initial PPDU can include four blocks with a specific failure threshold for each block and each block may include some number of HARQ units.

Figure 21:
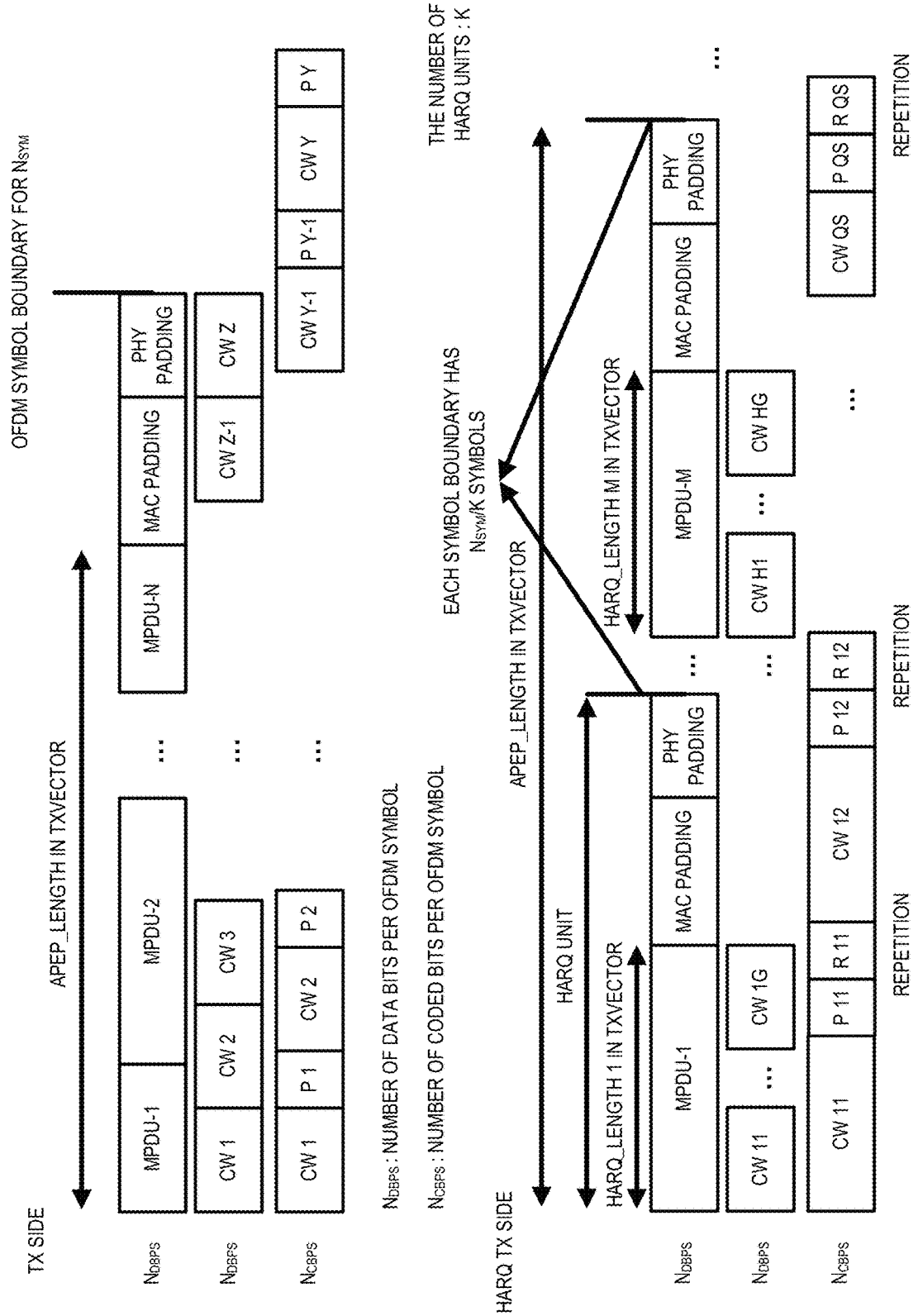
FIG. 21 shows a packet structure for repeating data in a HARQ approach, in accordance with some embodiments of the present disclosure.

In a HARQ method, padding could be inserted to fit the HARQ block (i.e., unit) size or MPDU length. To improve efficiency by reducing padding overhead, MPDU and/or codeword as a feedback unit could be repeated instead of simply adding padding values. FIG. 21 shows a packet structure for repeating data in a HARQ approach, in accordance with some embodiments of the present disclosure.

For a transmitting station, APEP_LENGTH is delivered in a TXVECTOR from the MAC layer and each MPDU is allowed to have a different size. To meet OFDM symbol boundary rules, MAC padding and PHY padding are appended to MPDUs.

In one embodiment, a HARQ process begins and the MAC layer starts by assigning the same length to each MPDU up to the last MPDU. This will reduce signaling overhead (i.e., it is not necessary to indicate every different MPDU length). In this case, additional signaling data could be added to a TXVECTOR, such as HARQ_LENGTH. Accordingly, the length of MPDUs, except the last MPDU (i.e., the last MPDU could be shorter than other MPDUs), is the same. Also, a value of HARQ_LENGTH of corresponding HARQ units in TXVECTOR can also be the same.

In some embodiments, each padding (e.g., MAC padding and/or PHY padding) is appended to each MPDU to meet OFDM symbol boundary rules.

In one embodiment, when at least one codeword has failed, HARQ units (e.g., a number of A-MPDUs, MPDUs, OFDM symbols, or codewords) with failed codewords are be retransmitted. In some embodiments, when retransmission of a HARQ unit is required, only failed codewords are retransmitted. In these embodiments, where part of the codewords in a HARQ unit are retransmitted, to keep the same length HARQ unit, retransmitted codewords could be repeated. Where part of a codeword in a HARQ unit is retransmitted, to keep the same length of each HARQ unit, padding could be appended to retransmitted codeword(s).

Figure 22:
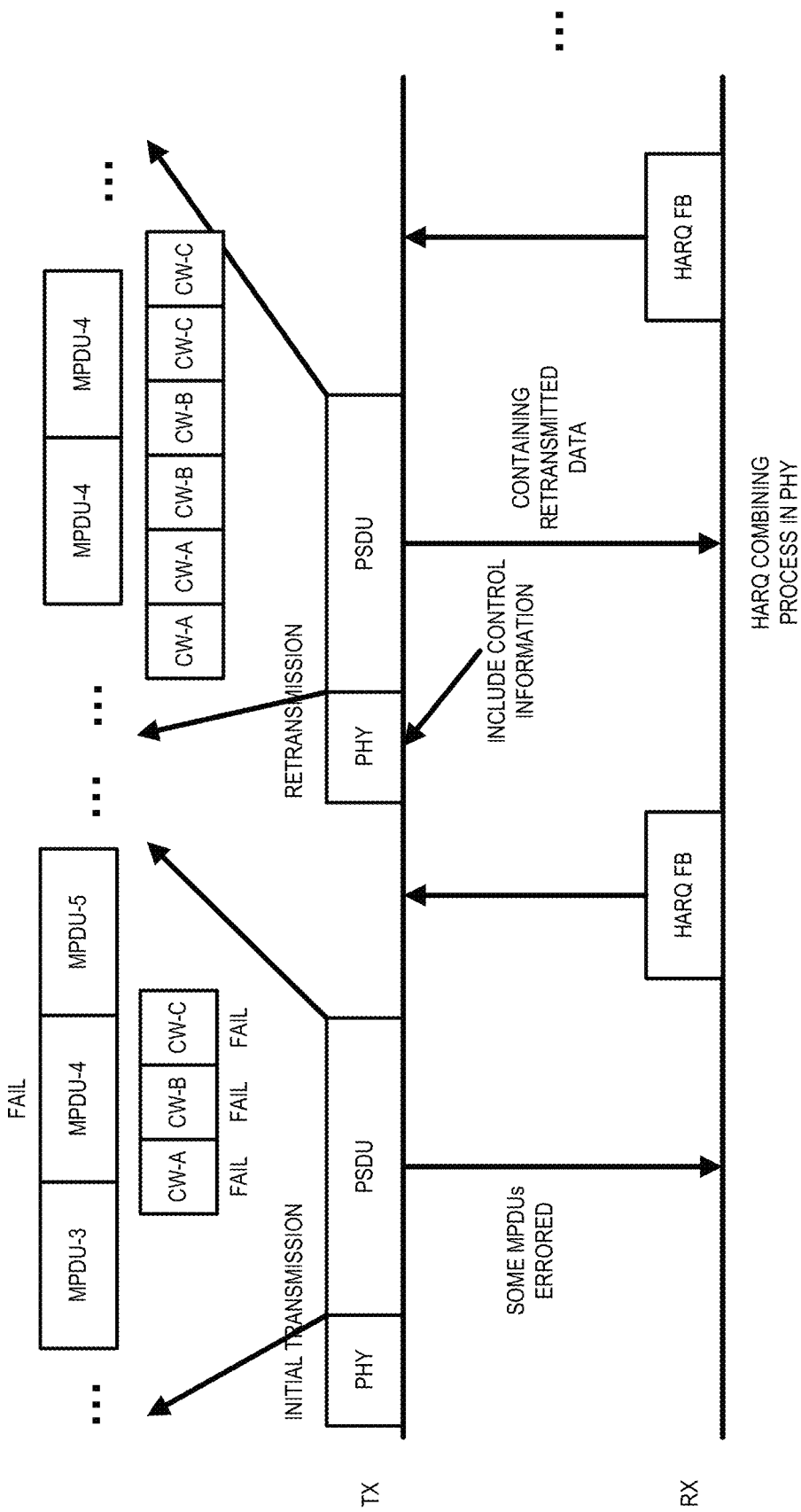
FIG. 22 shows a PHY Service Data Unit (PSDU) in which only repeated data is retransmitted, in accordance with some embodiments of the present disclosure.

In one embodiment, to support a HARQ process more efficiently, repetition could be appended to codeword and parity bit and the repetition comprises part of a codeword and/or parity bits. In some embodiments, a HARQ unit could include new data and/or retransmitted data. For example, a PSDU (e.g., MPDU) could include retransmitted data and new data together. In an example shown in FIG. 22, a PSDU (e.g., MPDU) include only repeated retransmitted data (e.g., CW-A, CW-B, and CW-C are provided twice in the HARQ retransmission). In one embodiment, the retransmitted PPDU in retransmission has the same length as the initial PPDU transmission when only retransmitted data is used. Given this technique, the probability of a successful retransmission is increased and the need for a next round of retransmission is decreased.

Figure 23:
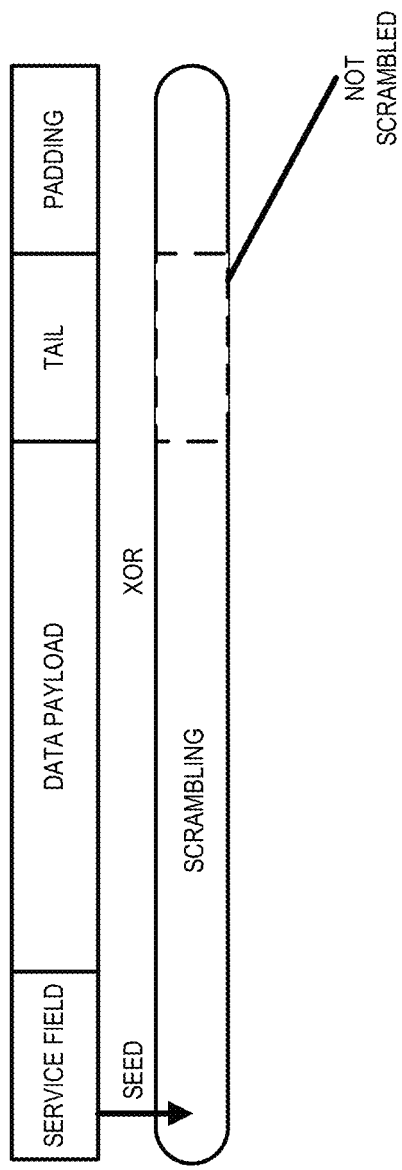
FIG. 23 shows an example of data scrambling, in accordance with some embodiments of the present disclosure.

In some embodiments, scrambling of information bits is a useful method to randomize transmitted information. Scrambling codes and/or scrambling sequences are intended to remove repeated bit patterns of an information sequence. Data information of non-high throughput (HT) PDDU and a HT PPDU is scrambled by using content as a scrambler seed with the first 7 bits of the service field. The tails bits are not scrambled. An example of the data information scrambling for non-HT and HT PPDUs is shown in FIG. 23.

Figure 24:
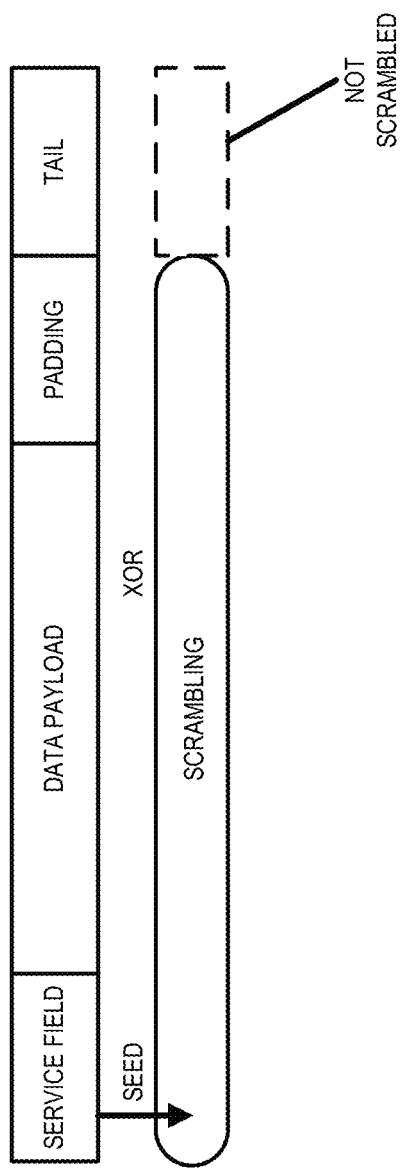
FIG. 24 shows an example of data scrambling, in accordance with some embodiments of the present disclosure.

The data information of very high throughput (VHT) PPDUs is scrambled by using the content in the first 7 bits of the service field. The scrambling is performed until tail field, which includes 6 tail bits and are the last bits of the data information sequence. An example of the data information scrambling for a VHT PPDU is shown in FIG. 24.

Scrambling can be done using maximum length sequences (sometimes known as m-sequences). One of example of a maximum length sequence is S(x) in Equation 11, which could be used as a generator polynomial.

$$S(x) = x7 + x4 + 1$$ Equation 11

Figure 25:
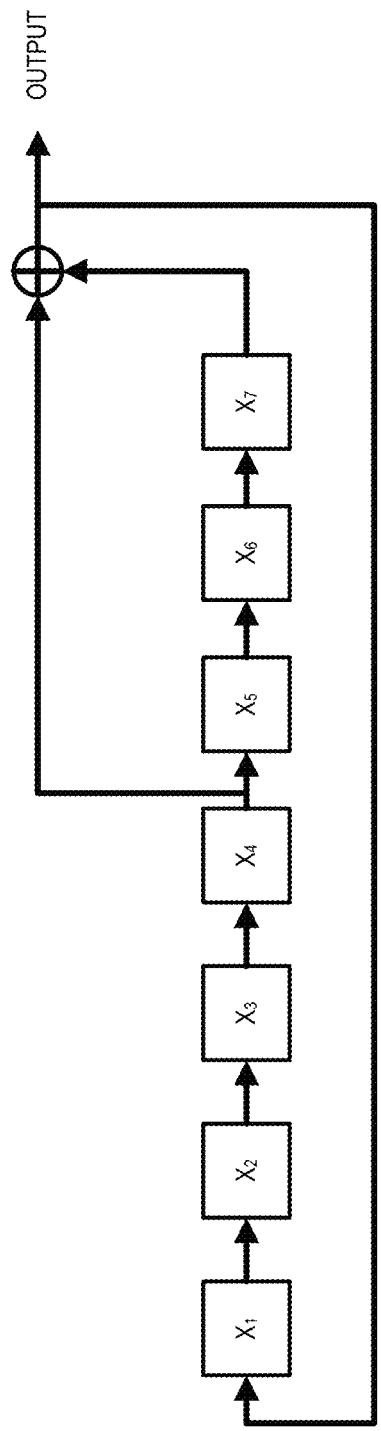
FIG. 25 shows a scrambling code generator, in accordance with some embodiments of the present disclosure.

An example of a scrambling code generator is shown in FIG. 25. As shown in FIG. 25, the 7 bits of an initial scrambling seed value are written into the delay registers X1 to X7.

Considering scrambled data portion of a PPDU that is scrambled with a first scrambler seed, a PPDU that is scrambled with a second scrambler seed for a retransmission (with different values) may result in a PHY layer at receiver not being able to perform a combining process during a HARQ procedure because the retransmitted data is likely to be differently randomized in comparison to the previously/originally transmitted information. To solve these issues, some solutions are presented.

In one embodiment, a PPDU in a HARQ process contains control information (e.g., in a control information field) corresponding to a scrambler seed. The value of the control information can be the same throughout a HARQ session (e.g., a transmission and retransmission(s) of data within a PPDU). The control information could be in a PHY preamble portion of the PPDU and this information could indicate whether data is retransmitted information even though several HARQ sessions are mixed between some STAs. In some embodiments, the control information could be in a service field followed by the data field. In some embodiments, the length of the control information is 7 bits or bytes. In some embodiments, the control information could be part of station identifier (STA-ID) or something corresponding to a STA-ID.

In one embodiment, a first HARQ unit has first control information while a second HARQ unit has second control information. In some embodiments, the first and the second control information correspond to scrambler seeds. One of example of a HARQ unit is shown in FIG. 21.

In some embodiments, a value of the first control information is the same during an entire HARQ session (e.g., a transmission and retransmission of a first HARQ unit). In some embodiments, a value of the second control information is the same during an entire HARQ session (e.g., a transmission and retransmission of a second HARQ unit).

In some embodiments, the first control information is a service field followed by a data field of a first HARQ unit. Similarly, in some embodiments, the second control information is a service field followed by a data field of a second HARQ unit. In some embodiments, the length of the control information is 7 bits or bytes.

In some embodiments, the first HARQ unit is required to be retransmitted after at least one codeword in the first HARQ unit was failed when it was previously transmitted.

Figure 26:
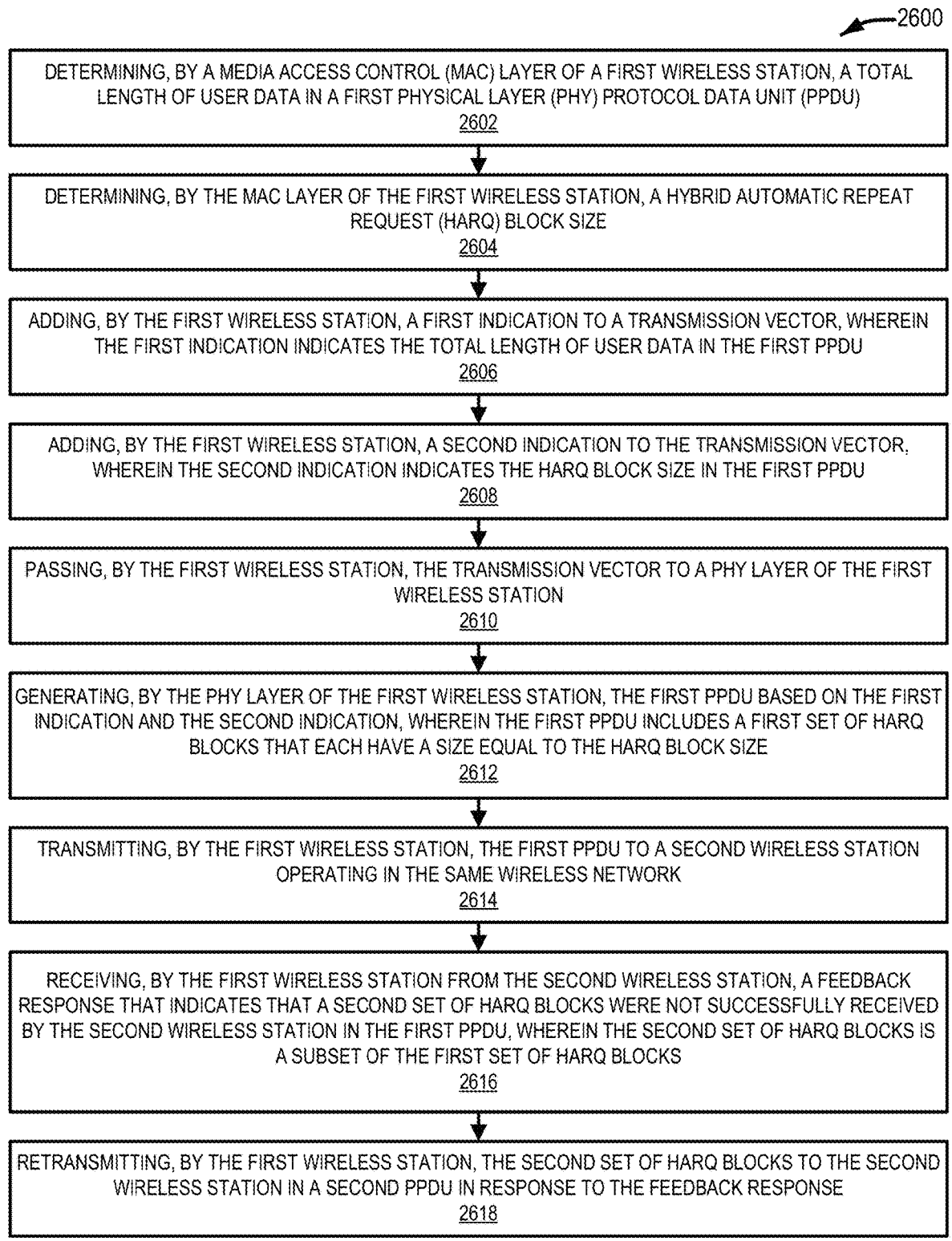
FIG. 26 shows a method for generating and transmitting a set of frames, in accordance with some embodiments of the present disclosure.

Turning to FIG. 26, a method 2600 will be described for generating and transmitting a set of frames. The method 2600 may be performed by a wireless station in a wireless network. In some embodiments, the method 2600 may be performed in relation to one or more of the details described in other portions of the description. Although described and shown in a particular order, in other embodiments one or more of the operations of the method 2600 may be performed in a different order, including in partially or entirely overlapping time periods.

As shown in FIG. 26, the method 2600 commences at operation 2602 with a Media Access Control (MAC) layer of a first wireless station determining a total length of user data in a first Physical Layer (PHY) Protocol Data Unit (PPDU) that will be transmitted by the first wireless station. For example, the MAC layer of the first wireless station may determine an aggregate MAC protocol data unit (A-MPDU)

pre-EOF padding (APEP) length for the first PPDU. The total length of user data in the PPDU may be determined in terms of time or a number of data symbols in the first PPDU.

At operation 2604, the MAC layer of the first wireless station determines a Hybrid Automatic Repeat Request (HARQ) block size (sometimes referred to as a HARQ unit size or HARQ unit length). For example, the first PPDU may include a set of HARQ blocks/units and each of the HARQ blocks may have an identical size or each of the HARQ blocks in the set of HARQ blocks may have independent sizes. The HARQ block size may be determined in terms of time, number of data symbols, number of A-MPDUs, number of MPDUs, or number of codewords. For example, the HARQ block size may be equal to the number of symbols ($N_{SYM}$) in the first PPDU divided by the total number of HARQ blocks, A-MPDUs, or MPDUs to be included in the first PPDU.

At operation 2606, the first wireless station (e.g., the MAC layer of the first wireless station) adds a first indication to a transmission vector and the first indication indicates the total length of user data in the first PPDU. For example, the transmission vector may be a TX VECTOR and the indication may be a number of bits that indicates a total length of user data in the first PPDU, which was determined at operation 2602. The transmission vector may be used by a physical (PHY) layer to construct a set of codewords and/or parity bits that define the first PPDU.

At operation 2608, the first wireless station (e.g., the MAC layer of the first wireless station) adds a second indication to the transmission vector and the second indication indicates the HARQ block size in the first PPDU. For example, the transmission vector may be a TX VECTOR and the indication may be a number of bits that indicates a HARQ block size to be used in the first PPDU, which was determined at operation 2604.

At operation 2610, the first wireless station passes the transmission vector to a physical (PHY) layer of the first wireless station. For example, the MAC layer passes the transmission vector (e.g., the TX VECTOR) to the PHY layer of the first wireless station, including the first indication and the second indication. As noted above, the PHY layer may use the transmission vector to generate the first PPDU, including a set of codewords and parity bits.

At operation 2612, the PHY layer of the first wireless station generates the first PPDU based on the first indication and the second indication. For example, the PHY layer generates the first PPDU to include a first set of HARQ blocks that each have a size equal to the HARQ block size. When the HARQ block size is independent for each HARQ block, the PHY layer generates each HARQ block according to the corresponding HARQ block size determined at operation 2604. In one embodiment, generating the first PPDU includes adding a segment of user data to a HARQ block in the first set of HARQ blocks and repeating a portion of the segment of user data in the HARQ block to meet the HARQ block size (e.g., repeated data). In one embodiment, the repeated data can be end-user data or management data (e.g., parity bits). In one embodiment, the PHY layer uses a scramble seed for scrambling the first PPDU (e.g., the data of the first PPDU).

At operation 2614, the first wireless station transmits the first PPDU to a second wireless station operating in the wireless network.

At operation 2616, the first wireless station receives a feedback response from the second wireless station in response to the first PPDU. The feedback response may be a HARQ feedback response and indicates that a second set of HARQ blocks were not successfully received by the second wireless station in the first PPDU (i.e., the second wireless station has not received every piece of data in the first PPDU). In this embodiment, the second set of HARQ blocks is a subset of the first set of HARQ blocks or the first set of HARQ blocks is the same as the second set of HARQ blocks. In one embodiment, the feedback response indicates that the second set of HARQ blocks exceeds a threshold. In some embodiments, the threshold is determined by the first wireless station and the second wireless station prior to transmission by the first wireless station of the first PPDU. For example, the threshold is included in a capabilities object shared by one or more of the first wireless station and the second wireless station or the threshold may be set based on an indication in a capabilities object shared by one or more of the first wireless station and the second wireless station.

At operation 2618, the first wireless station retransmits the second set of HARQ blocks to the second wireless station in a second PPDU in response to the feedback response. Accordingly, the second wireless station may attempt to combine the successfully received HARQ blocks from the first PPDU with the newly retransmitted HARQ blocks in the second PPDU to successfully decode/receive all the data from the first PPDU using both the first and second PPDUs. In one embodiment, the PHY layer uses the same scramble seed as that used for the first PPDU to scramble the second PPDU. In one embodiment, the first wireless station may continually receive feedback responses from the second wireless station until each HARQ block in the first set of HARQ blocks is successfully decoded/received. In response to each of these feedback responses, the PHY layer of the first wireless station may use the same scrambler seed for any future transmissions/PPDUs. In one embodiment, the second PPDU includes each of first set of the HARQ blocks from the first PPDU when one or more of the second PPDU and the feedback response indicates that the second set of HARQ blocks exceeds the threshold (e.g., the first PPDU is the same as the second PPDU when the threshold is met or exceeded).

Although many of the solutions and techniques provided herein have been described with reference to a WLAN system, it should be understood that these solutions and techniques are also applicable to other network environments, such as cellular telecommunication networks, wired networks, etc. In some embodiments, the solutions and techniques provided herein may be or may be embodied in an article of manufacture in which a non-transitory machine-readable medium (such as microelectronic memory) has stored thereon instructions which program one or more data processing components (generically referred to here as a "processor" or "processing unit") to perform the operations described herein. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In some cases, an embodiment may be an apparatus (e.g., an AP STA, a non-AP STA, or another network or computing device) that includes one or more hardware and software logic structures for performing one or more of the operations described herein. For example, as described herein, an apparatus may include a memory unit, which stores instructions that may be executed by a hardware processor installed in the apparatus. The apparatus may also include one or more other hardware or software elements, including a network interface, a display device, etc.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system may carry out the computer-implemented methods described herein in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method performed by a first wireless station operating in a wireless network, the method comprising:
    determining, by a Media Access Control (MAC) layer of the first wireless station, a total length of user data in a first Physical Layer (PHY) Protocol Data Unit (PPDU);
    determining, by the MAC layer of the first wireless station, a Hybrid Automatic Repeat Request (HARQ) block size;
    adding, by the first wireless station, a first indication to a transmission vector, wherein the first indication indicates the total length of user data in the first PPDU;
    adding, by the first wireless station, a second indication to the transmission vector, wherein the second indication indicates the HARQ block size in the first PPDU;
    passing, by the first wireless station, the transmission vector to a PHY layer of the first wireless station;
    generating, by the PHY layer of the first wireless station, the first PPDU based on the first indication and the second indication, wherein the first PPDU includes a first set of HARQ blocks that each have a size equal to the HARQ block size; and
    transmitting, by the first wireless station, the first PPDU to a second wireless station operating in the wireless network.

2. The method of claim 1, further comprising:
    receiving, by the first wireless station from the second wireless station, a feedback response that indicates that a second set of HARQ blocks were not successfully received by the second wireless station in the first PPDU, wherein the second set of HARQ blocks is a subset of the first set of HARQ blocks; and
    retransmitting, by the first wireless station, the second set of HARQ blocks to the second wireless station in a second PPDU in response to the feedback response.

3. The method of claim 2, wherein one or more of the second PPDU and the feedback response indicates that the second set of HARQ blocks exceeds a threshold.

4. The method of claim 3, wherein the second PPDU includes each of first set of the HARQ blocks from the first PPDU when one or more of the second PPDU and the feedback response indicates that the second set of HARQ blocks exceeds the threshold.

5. The method of claim 3, wherein the threshold is determined by the first wireless station and the second wireless station prior to transmission by the first wireless station of the first PPDU.

6. The method of claim 5, wherein the threshold is included in a capabilities object shared by one or more of the first wireless station and the second wireless station.

7. The method of claim 2, wherein the first wireless station uses a same scramble seed for scrambling the first PPDU and the second PPDU.

8. The method of claim 7, wherein the first wireless station uses the same scramble seed for any PPDUs transmitted subsequent to the second PPDU while the second wireless station has not successfully received all data that was included in the first PPDU.

9. The method of claim 1, wherein each of the HARQ blocks in the first set of HARQ blocks are one of an aggregated media access control (MAC) protocol data unit (A-MPDU), a MAC protocol data unit (A-MPDU), and a codeword.

10. The method of claim 1, wherein generating, by the PHY layer of the first wireless station, the first PPDU includes:
adding a segment of user data to a HARQ block in the first set of HARQ blocks; and
repeating a portion of the segment of user data in the HARQ block to meet the HARQ block size.

11. A first wireless device operating in a wireless network, the first wireless device comprising:
a memory device storing a set of instructions; and
a processor coupled to the memory device, wherein the set of instructions when executed by the processor cause the first wireless device to:
determine, by a Media Access Control (MAC) layer of the first wireless device, a total length of user data in a first Physical Layer (PHY) Protocol Data Unit (PPDU);
determine, by the MAC layer of the first wireless device, a Hybrid Automatic Repeat Request (HARQ) block size;
add a first indication to a transmission vector, wherein the first indication indicates the total length of user data in the first PPDU;
add a second indication to the transmission vector, wherein the second indication indicates the HARQ block size in the first PPDU;
pass the transmission vector to a PHY layer of the first wireless device;
generate, by the PHY layer of the first wireless device, the first PPDU based on the first indication and the second indication, wherein the first PPDU includes a first set of HARQ blocks that each have a size equal to the HARQ block size; and
transmit the first PPDU to a second wireless device operating in the wireless network.

12. The first wireless device of claim 11, wherein the set of instructions further cause the first wireless device to:
receive, from the second wireless device, a feedback response that indicates that a second set of HARQ blocks were not successfully received by the second wireless device in the first PPDU, wherein the second set of HARQ blocks is a subset of the first set of HARQ blocks; and
retransmit the second set of HARQ blocks to the second wireless device in a second PPDU in response to the feedback response.

13. The first wireless device of claim 12, wherein one or more of the second PPDU and the feedback response indicates that the second set of HARQ blocks exceeds a threshold.

14. The first wireless device of claim 13, where the second PPDU includes each of first set of the HARQ blocks from the first PPDU when one or more of the second PPDU and the feedback response indicates that the second set of HARQ blocks exceeds the threshold.

15. The first wireless device of claim 13, wherein the threshold is determined by the first wireless device and the second wireless device prior to transmission by the first wireless device of the first PPDU.

16. The first wireless device of claim 15, wherein the threshold is included in a capabilities object shared by one or more of the first wireless device and the first wireless device.

17. The first wireless device of claim 11, wherein first wireless device uses a same scramble seed for scrambling the first PPDU and any PPDU transmitted subsequent to the first PPDU as part of a HARQ session while the first wireless device has not successfully received all data that was included in the first PPDU.

18. The first wireless device of claim 11, wherein each of the HARQ blocks in the first set of HARQ blocks are one of an aggregated media access control (MAC) protocol data unit (A-MPDU), a MAC protocol data unit (A-MPDU), and a codeword.

19. The first wireless device of claim 11, wherein generating, by the PHY layer of the first wireless device, the first PPDU includes:
adding a segment of user data to a HARQ block in the first set of HARQ blocks; and
repeating a portion of the segment of user data in the HARQ block to meet the HARQ block size.

20. A non-transitory machine-readable medium that stores instructions, which when executed by a processor of a first wireless device operating in a wireless network, cause the first wireless device to:
determine, by a Media Access Control (MAC) layer of the first wireless device, a total length of user data in a first Physical Layer (PHY) Protocol Data Unit (PPDU);
determine, by the MAC layer of the first wireless device, a Hybrid Automatic Repeat Request (HARQ) block size;
add a first indication to a transmission vector, wherein the first indication indicates the total length of user data in the first PPDU;
add a second indication to the transmission vector, wherein the second indication indicates the HARQ block size in the first PPDU;
pass the transmission vector to a PHY layer of the first wireless device;
generate, by the PHY layer of the first wireless device, the first PPDU based on the first indication and the second indication, wherein the first PPDU includes a first set of HARQ blocks that each have a size equal to the HARQ block size; and
transmit the first PPDU to a second wireless device operating in the wireless network.

* * * * *